US011470765B2

(12) United States Patent
Schembri et al.

(10) Patent No.: US 11,470,765 B2
(45) Date of Patent: Oct. 18, 2022

(54) SYSTEM AND METHOD FOR CONTROLLING THE FLOW OF AGRICULTURAL PRODUCTS FROM A VARIABLE-RATIO BLENDING APPLICATOR

(71) Applicant: CLEAN SEED AGRICULTURAL TECHNOLOGIES LTD., Burnaby (CA)

(72) Inventors: Charles Joseph Schembri, Burnaby (CA); Edward Quon, Burnaby (CA); Gordon Blair Wilson, Burnaby (CA); Robert Sydney Ruff, Burnaby (CA); Colin Mark Rosengren, Burnaby (CA)

(73) Assignee: Clean Seed Agricultural Technologies Ltd., Burnaby (CA)

( * ) Notice: Subject to any disclaimer, the term of this patent is extended or adjusted under 35 U.S.C. 154(b) by 598 days.

(21) Appl. No.: 16/090,510

(22) PCT Filed: Apr. 3, 2017

(86) PCT No.: PCT/CA2017/050407
§ 371 (c)(1),
(2) Date: Oct. 1, 2018

(87) PCT Pub. No.: WO2017/173532
PCT Pub. Date: Oct. 12, 2017

(65) Prior Publication Data

US 2019/0090416 A1 Mar. 28, 2019

Related U.S. Application Data

(60) Provisional application No. 62/373,082, filed on Aug. 10, 2016, provisional application No. 62/317,898, filed on Apr. 4, 2016.

(51) Int. Cl.
*A01C 7/08* (2006.01)
*A01C 7/10* (2006.01)
(Continued)

(52) U.S. Cl.
CPC .............. *A01C 7/082* (2013.01); *A01C 7/102* (2013.01); *A01C 7/124* (2013.01); *A01C 7/125* (2013.01);
(Continued)

(58) Field of Classification Search
CPC ......... A01C 7/081; A01C 7/082; A01C 7/102; A01C 7/105; A01C 7/124; A01C 15/006; A01C 15/007
See application file for complete search history.

(56) References Cited

U.S. PATENT DOCUMENTS 3,548,765 A * 12/1970 Grataloup .............. A01C 7/081 111/60
4,060,181 A * 11/1977 Grataloup .............. A01C 7/081 406/93
(Continued)

FOREIGN PATENT DOCUMENTS

AU 200022630 A1 10/2000
AU 2009202837 B2 3/2014
(Continued)

OTHER PUBLICATIONS

African Regional Intellectual Property Organizaiton (ARIPO)—Examination Report (First Report) and Search Report, dated Apr. 6, 2020, issued in relation to corresponding application No. AP/P/2018/011111.
(Continued)

*Primary Examiner* — Alicia Torres
(74) *Attorney, Agent, or Firm* — Antony C. Edwards

(57) ABSTRACT

An air manifold system for supplying an agricultural product to a plurality of metering devices comprises a product hopper having a product flow cavity, the product cavity separated from a first plenum by an air agitator sandwiched between the first plenum and the product flow cavity. The
(Continued)

hopper comprises a plurality of nozzles extending through a wall of the hopper. A venturi assembly is in fluid communication with at least one nozzle. A first forced air stream flows through the first plenum and the air agitator into the product flow cavity to agitate and entrain agricultural product in the first air stream, and the first air stream carries the entrained agricultural product into the nozzles. A second forced air stream flows through the venturi assembly to accelerate the first air stream and the entrained product towards and through the supply hoses connected to the nozzles.

19 Claims, 15 Drawing Sheets

(51) Int. Cl.

*A01C 7/12* (2006.01)
*A01C 15/00* (2006.01)
*A01C 19/02* (2006.01)
*H02P 8/14* (2006.01)
*H02P 8/34* (2006.01)

(52) U.S. Cl.

CPC .......... *A01C 15/006* (2013.01); *A01C 15/007* (2013.01); *A01C 19/02* (2013.01); *H02P 8/14* (2013.01); *H02P 8/34* (2013.01); *A01C 7/081* (2013.01); *A01C 7/105* (2013.01)

(56) References Cited

U.S. PATENT DOCUMENTS

| | | | | |
|---|---|---|---|---|
| 4,453,866 | A | 6/1984 | Ryan | |
| 4,569,486 | A | 2/1986 | Balmer | |
| 4,767,062 | A | 8/1988 | Fletcher | |
| 4,793,742 | A | 12/1988 | Strand | |
| 4,964,575 | A | 10/1990 | Takata | |
| 5,156,102 | A * | 10/1992 | Andersen | A01C 7/081 111/175 |
| 6,047,652 | A | 4/2000 | Prairie et al. | |
| 6,213,690 | B1 | 4/2001 | Gregor et al. | |
| 6,283,679 | B1 | 9/2001 | Gregor et al. | |
| 6,688,244 | B1 | 2/2004 | Meyer et al. | |
| 6,935,254 | B2 | 8/2005 | Ostrander et al. | |
| 7,025,010 | B2 | 4/2006 | Martin et al. | |
| 7,418,908 | B2 | 9/2008 | Landphair et al. | |
| 9,357,693 | B2 | 6/2016 | Friggstad | |
| 2001/0013309 | A1 | 8/2001 | Mayerle et al. | |
| 2003/0177967 | A1 | 9/2003 | Lee et al. | |
| 2007/0181048 | A1 * | 8/2007 | Pleyer | A01C 7/082 111/175 |
| 2010/0101469 | A1 | 4/2010 | Landphair et al. | |
| 2015/0166269 | A1 * | 6/2015 | Roberge | B65G 53/40 406/108 |
| 2015/0257332 | A1 | 9/2015 | Meyer et al. | |
| 2015/0366127 | A1 | 12/2015 | Roberge et al. | |
| 2016/0050842 | A1 | 2/2016 | Sauder et al. | |

FOREIGN PATENT DOCUMENTS

| | | | |
|---|---|---|---|
| CA | 1298247 | C | 3/1992 |
| CA | 2628104 | | 7/2007 |
| CA | 2704959 | | 5/2011 |
| CA | 2803403 | | 7/2013 |
| CA | 2912449 | | 11/2014 |
| CA | 3017855 | A1 | 1/2021 |
| EP | 0061335 | B1 | 1/1986 |
| EP | 0743268 | A2 | 11/1996 |
| EP | 1164827 | B1 | 1/2003 |
| EP | 1216610 | A2 | 11/2004 |
| EP | 2353357 | A1 | 9/2012 |
| JP | 2000033996 | A | 2/2000 |
| UA | 84547 | C2 | 11/2008 |
| WO | 2011056123 | A1 | 5/2011 |
| WO | 2016/118277 | | 7/2016 |

OTHER PUBLICATIONS

Ministry for Development of Economy, Trade and Agriculture of Ukraine-Ukrainian Intellectual Property Institute (UKRPATENT)—Decision on Grant a Patent for Invention, issued in relation to corresponding application No. a 201810835 (patent No. 123913).

Alkhatib, Nageib, Examination Report No. 1, dated Apr. 7, 2022, 7 pages, IP Australia, Sydney New South Wales, Australia.

* cited by examiner

SYSTEM AND METHOD FOR CONTROLLING THE FLOW OF AGRICULTURAL PRODUCTS FROM A VARIABLE-RATIO BLENDING APPLICATOR

FIELD OF THE DISCLOSURE

This disclosure relates to the field of agricultural machinery related to applicators, such as seed drills and the like, having variable rate metering systems useful in prescription farming, and in particular to a system and method for controlling the flow of agricultural products distributed by a variable-ratio blending applicator.

BACKGROUND

In applicant's published Canadian patent application number 2,912,449 titled "A System for Variable Ratio Blending of Multiple Agricultural Products for Delivery via a Ported Opener" to Rosengren et al, (herein referred to as application no. '449) there is described a series of metering assemblies mounted in clusters or pods across an applicator. The metering assemblies are fed granular or liquid agricultural products, such as seeds, fertilizer or water, via a flow redirector into a manifold feeding a metering assembly, which metering assembly controls the flow rate of the agricultural product. The agricultural products then flow from the metering assemblies into a corresponding single opener, the opener having conduits to transport the agricultural products into the soil.

The metering assemblies include a local hopper or other space for containing a reserve of agricultural product, resilient rollers encased in a hollow metering housing having an interior surface, a channel leading from the local hopper or space into the metering housing, and a channel leading from the metering housing to a chute, flowing into the opener. Each roller is rotated within the metering housing by means of a driving shaft attached to a corresponding stepper motor located outside the metering housing. Each roller is in contact with a portion of the interior surface of the metering housing, and is sandwiched between discs. The roller may be soft resilient polyurethane foam, for example made from 40 pound No. 3 expanded foam. The exterior surface around the circumference of the roller may be smooth or scalloped or otherwise textured. In jurisdictions permitting, application no. '449 is incorporated by reference herein.

The circumferential outer surface of the roller is resiliently biased against the correspondingly curved inner surface of the metering housing. As the granular agricultural product falls from the local hopper into the metering housing, and as the roller rotates within the housing, the granulated agricultural product becomes wedged in between the outer surface of the roller and the corresponding inner surface of the metering housing. A drive shaft driven by a stepper motor rotates the roller within the metering housing. The granular agricultural product wedged in between the outer surface of the roller and the corresponding interior surface of the metering housing is dragged towards the chute and the outlet. In alternate embodiments, wherein the surface of the roller is contoured, such as for example with scallops, indents or pockets, the agricultural product is generally contained within the spaces created by the contouring between the outer surface of the roller and the metering housing. Small pockets of agricultural product are thus pushed along the interior of the metering housing by the rotation of the roller.

There are a number of problems with the metering assemblies known in the prior art. One problem is that the flow rate of agricultural product into the soil may not be consistent. Rather than producing a constant flow of agricultural product from the opener into the soil, the prior art metering assemblies, such as that described in application no. '449, tend to deposit small pockets of agricultural product that are released into the soil in pulses. To maximize the efficiency of the plot of land being seeded or fertilized by product dispensed from the metering assembly, it is desirable to release the agricultural products at a steady flow rate so as to evenly distribute the product in the soil. For example, releasing seeds in small pockets may give insufficient space for the plants to grow optimally, or releasing fertilizer in small pockets may result in seeds or plants receiving too little or too much fertilizer at any given point.

Another problem with prior art metering assemblies, of which applicant is aware, is that blockages may occur when moisture causes granular agricultural product, such as fertilizer, to clump together, resulting in a clump that inhibits or prevents the roller from rotating. Where the roller is electrically driven, such a clump may cause the electric motor to stall because insufficient torque is provided to the motor to overcome the blockage caused by the clump trapped or pinched between the roller and metering housing. Similarly, foreign material, such as for example a bolt or a rock, may occasionally be inadvertently introduced and similarly become trapped between the roller and the metering housing within the metering assembly. Such clumps or foreign objects, when they cause a blockage sufficient to stall the electric motor driving the roller, such as a stepper motor, may require that the system be shut down to clear the blockage. Where there are many metering assemblies across, for example, a seeder or planter, each of the metering assemblies needs to be inspected to determine where the blockage (or blockages) occurred, in order to clear those blockages and restart the motor.

Typically, the blockage is physically cleared from the metering assembly containing the stalled motor. This process may be cumbersome and time-consuming, as for example, there may be six metering assemblies disposed within a row meter cluster and a total of 60 metering clusters in a seeding system, and therefore a total of 360 metering assemblies utilizing 360 individual stepper motors across the entire system.

In the embodiments disclosed in the prior art of which applicant is aware, each stepper motor is disposed within the metering cluster, with the driving shaft oriented outward of the metering cluster and coupled to the roller of a metering assembly. The stepper motor is not readily accessible for inspection and maintenance by the user. Users of the prior art metering systems, upon experiencing a stalled motor in one of the metering clusters, may opt to ignore a blockage or stalled motor (assuming the user even knows that a blockage or stall has occurred), and continues travelling over the ground, which may result in one or more rows remaining unutilized for an entire season, as the agricultural product for that now is blocked. There is therefore a need for improved detection of blockages or the onset of blockages, and an automated or remote method of clearing a blockage from a metering system when such blockages occur.

There are several areas within the prior art metering assemblies, of which applicant is aware, where a blockage may occur. As stated above, granular agricultural products, such as seed or fertilizer, may sometimes clump together in the presence of moisture introduced to the product. When granular products clump together, they may jam up at the point of entry or nip between the out-feed from the localized hopper, and the metering housing or roller respectively, thereby blocking any further agricultural granular product from entering the metering housing so as to be urged forward by the rotational movement of the roller. A blockage may also occur when agricultural product clumps block the exit from the metering housing and corresponding chute that leads to the intakes in the opener, from which the agricultural product ultimately gets distributed into the ground. In addition, agricultural product may jam up on the roller itself, becoming trapped between the outer circumferential surface of the roller and the inner surface of the metering housing. Jamming of this nature may increase the friction between the surface of the roller and the inner surface of the metering housing to the extent that the friction cannot be overcome by the torque provided to the roller by the stepper motor. This may result in causing the stepper motor to stall, thereby preventing any further dispensing of agricultural product from that particular metering assembly until the jam is cleared. It is therefore desirable to provide a metering assembly and system which is capable of anticipating that a motor stall may occur and means for remotely clearing a blockage before the motor becomes stalled.

Another difficulty with using the metering assembly and system disclosed in the prior art, of which applicant is aware, is that a significant portion of the circumferential outer surface of the roller is resiliently biased against a significant portion of the corresponding inner surface of the metering housing, thereby resulting in a significant amount friction between the inner surface of the metering housing and the circumferential surface of the roller, thereby increasing the amount of torque required to drive rotation of the roller with the stepper motor. Considering that, for example, 360 individual stepper motors may be required to drive the rollers in the six metering assemblies contained in each of 60 metering clusters in a given system, the power consumption to drive all 360 stepper motors is great. It is therefore desirable to reduce the amount of power required to drive each stepper motor, by reducing the torque required from the motor so as to reduce the overall power consumption of the metering assembly.

It is known in the prior art that electronic controllers for controlling and driving a stepper motor may include integrated circuits, such as for example, the StallGuard™ feature of electronic controllers for stepper motors manufactured by the company Trinamic™. StallGuard™ measures the load on a stepper motor utilizing the back electromotive force (EMF) on the coils of the motor so as to detect the occurrence of an unusually high load on the motor, and produces a so-called StallGuard™ value (herein referred to as the SG value), which value represents the load on the stepper motor. The SG value ranges from a maximum non-zero value, representing no load on the stepper motor, and approaches zero, representing the stepper motor at a maximum load and therefore nearing or at a stall condition. The SG value is provided to the electronic controller, which queries a lookup table to determine whether the SG value indicates a stall condition. Upon detecting an increased load on a stepper motor, the StallGuard™ feature momentarily increases the torque applied to the motor for the purpose of clearing the obstruction that is causing the increased load on the motor.

Although this StallGuard™ feature generally works to avoid stall conditions for various applications using stepper motors, in the present application it has been observed that the signal from the StallGuard™ feature generally does not detect a potential motor stall condition prior to the motor actually becoming stalled. The problem is that by the time the StallGuard™ feature sends a signal indicating a near stall condition and increases the torque to the motor, the prior art metering assembly, of which the applicant is aware, is already in a stall condition, and so increasing the torque to the motor at that point does not result in clearing the blockage and preventing a stall. Furthermore, once the motor is in a stall condition, temporarily increasing the torque to the motor causes the SG value to momentarily indicate the motor is again operating under normal conditions and the torque is thereby reduced by the controller, but since the blockage has yet to be cleared, the motor merely jitters back and forth without resuming normal operation, causing the SG values to continually vary between a stall reading and a normal reading, which results in a failure by the controller to provide sufficient torque to the motor for a sufficient period of time required to clear the blockage.

In the metering system known to the applicant in the prior art, when a stepper motor is stalled, the most likely way for the user to get the motor running again is to halt the operation, investigate each of the row metering clusters to locate the stalled motor, and then use hand tools to physically remove the blockage that caused the motor to stall. This problem reduces the overall efficiency of using the metering system, and it is therefore desirable to provide means for detecting a blockage onset, that is, before the blockage occurs so as to utilize the electronic controller to effectively clear the blockage remotely, thereby greatly reducing potential system downtime.

The metering systems known to the applicant in the prior art also include means for resupplying the metering assemblies with granular agricultural product from large capacity hoppers attached to, or pulled behind, the applicator. In the various systems known to the applicant in the prior art, these product delivery systems typically utilize an air source to drive an airflow through the large capacity hoppers, and a series of hoses and connectors to deliver the agricultural products to an auxiliary, or local, hopper, or other container adapted to hold a small reserve of product proximal the metering assembly. In the prior art, such as the system described in U.S. Pat. No. 6,688,244 issued to Meyer et al, the air stream flows through a large capacity hopper where it picks up agricultural product. The air stream carrying agricultural product then flows through a supply hose and deposits the product into the auxiliary hopper through an inlet. The auxiliary hopper has a vent for venting the airflow, located somewhere above the auxiliary hopper inlet.

As the auxiliary hopper fills with product, the inlet is eventually blocked off by the agricultural product, slowing the air stream. Theoretically, as the air stream slows, the air stream should no longer pick up product from the large capacity hopper, effectively shutting off the flow of product to that particular auxiliary hopper. However, the applicant has found that where this type of supply system is used, the air stream carrying product merely slows, but does not completely stop, resulting in a continuous, albeit reduced, amount of product carried by the air stream into the supply hose. Because the air stream has slowed, product may not be carried all the way to the auxiliary hopper; rather, the product may settle in the supply hoses leading to the auxiliary hopper. Eventually, this reduced flow of product may block the supply hose itself, therefore requiring the user to shut down the system and clear the supply hoses, which is a cumbersome process that may result in significant downtime. It is therefore desirable to improve the product delivery system for an applicator so as to lessen or eliminate the reduced flow of product into an auxiliary hopper once the auxiliary hopper, or other product reserve, or reservoir is full of product.

SUMMARY OF THE DISCLOSED EMBODIMENTS

In an embodiment of the present disclosure, a seed metering flow control device comprises a reservoir for holding agricultural product, the reservoir in fluid communication with a roller housing member, the roller housing member comprising an inner surface, the inner surface comprising an inlet, a contact portion, a non-contact portion and an angled discharge portion, the roller housing member adapted to receive and support a resilient cylindrical roller, the roller comprising a radially-outer surface, the radially-outer surface comprising a plurality of channels radially spaced apart, the roller rotatable about an axis of rotation and the roller driven by a driving means in a rotational direction, the angled discharge portion comprising a wide end and a narrow end, wherein the wide end of the angled discharge portion is adjacent the contact portion, and wherein the narrow end of the angled discharge portion is adjacent the non-contact portion of the inner surface of the roller housing member, a conduit comprising the non-contact portion adjacent the narrow end of the angled discharge portion, wherein a first channel of the plurality of channels is sequentially adjacent the inlet, the contact portion, the angled discharge portion and the non-contact portion of the roller housing member as the roller completes one full revolution within the roller housing member, wherein as the roller is driven in the rotational direction the first channel of said plurality of channels is substantially fully exposed when adjacent the inlet so as to receive an amount of agricultural product from the reservoir and substantially fully enclosed when adjacent the contact portion and the wide end of the angled discharge portion so as to substantially contain said amount of agricultural product, the first channel of the plurality of channels is then incrementally exposed to the conduit as the first channel travels from adjacent the wide end to adjacent the narrow end of the angled discharge portion, so as to incrementally release the amount of agricultural product into the conduit at a flow rate proportional to a rotational speed of the roller.

In another embodiment of the present disclosure, a seed metering flow control device is provided wherein the driving means includes a stepper motor.

In another embodiment of the present disclosure, a seed metering flow control device further comprises an opener for transporting said agricultural product into a growth medium, the opener in fluid communication with the conduit.

In a further embodiment of the present disclosure, a seed metering flow control device is provided wherein the reservoir is selected from a group comprising: a local hopper, a tube, and a y-connector.

In a further embodiment of the present disclosure, a process for detecting an onset of a stall in a stepper motor in a flow control device comprises: tuning the motor to determine a plurality of parameters of the motor comprising a nominal torque value, a threshold stall value and a near threshold stall value; determining a plurality of dynamic variables and a plurality of static variables of an operating condition of the motor, inputting the plurality of static variables into the controller and causing the plurality of static and dynamic variables to be reflected by a value; monitoring by a controller a plurality of dynamic variables of the motor; detecting when the value approaches the near threshold stall value towards the threshold stall value and slowly increasing the torque from the motor applied to the roller; and detecting when the torque returns to the nominal torque value and slowly decreasing torque from the motor applied to the roller.

In another embodiment of the present disclosure, a process for detecting an onset of a stall in a stepper motor in a flow control device further comprises tuning the motor to determine a threshold rotational speed of the motor, detecting the threshold rotational speed of the motor, and delaying the detecting of the value approaching the near threshold stall value until a detected rotational speed of the motor exceeds the threshold rotational speed of the motor.

In another embodiment of the present disclosure, a process for detecting an onset of a stall in a stepper motor in a flow control device further comprises detecting the rotational speed of the motor and outputting a signal indicating the motor is stalled when the detected rotational speed of the motor is zero.

In another embodiment of the present disclosure, a process for detecting an onset of a stall in a stepper motor in a flow control device further comprises a signal indicating the motor is stalled, the signal selected from a group comprising: a visual signal, an audio signal, a combined audio-visual signal.

In another embodiment of the present disclosure, a process for detecting an onset of a stall in a stepper motor in a flow control device is applied to detect the onset of a stall in each motor of a plurality of stepper motors driving a corresponding plurality of rollers in a plurality of seed metering flow control devices.

In another embodiment of the present disclosure, a process for detecting an onset of a stall in a stepper motor in a flow control device further comprises a signal identifying a specific stalled motor of the plurality of motors.

In another embodiment of the present disclosure, a process for detecting an onset of a stall in a stepper motor in a flow control device further comprises the controller monitoring at least one blockage sensor, detecting a blockage in the device and outputting a signal indicating the blockage.

In another embodiment of the present disclosure, a process for detecting an onset of a stall in a stepper motor in a flow control device further comprises a signal indicating the blockage, wherein the signal is selected from the group comprising: a visual signal, an audio signal, a combined audio-visual signal.

In another embodiment of the present disclosure, an air manifold system for supplying a plurality of seed metering flow control devices with an agricultural product comprises: a product hopper in fluid communication with a product flow cavity, the product hopper adapted to contain a granular agricultural product, the product flow cavity in fluid communication with a first plenum and a plurality of nozzles, wherein a first air stream generated by a first air source flows through the first plenum, the product flow cavity and into the plurality of nozzles, wherein the plurality of nozzles are adapted to be coupled to corresponding supply hoses, at least one venturi assembly in fluid communication with at least one nozzle of the plurality of nozzles, the venturi assembly comprising a venturi, a second air stream supply driving a second air stream through the venturi so as to accelerate the first air stream, wherein granular agricultural product becomes entrained in the first and second air streams.

In another embodiment of the present disclosure, an air manifold system for supplying a plurality of seed metering flow control devices with an agricultural product further comprises corresponding supply hoses, a reservoir adapted to hold agricultural product coupled to a downstream end of each supply hose, wherein each reservoir is adapted to feed a corresponding seed metering flow control device, wherein the reservoir comprises a screened vent and wherein the first air stream is substantially reduced when the screened vent is substantially blocked by said granular agricultural product accumulating in said reservoir.

In another embodiment of the present disclosure, an air manifold system for supplying a plurality of seed metering flow control devices with an agricultural product further comprises a plurality of venturi assemblies, wherein each nozzle of the plurality of nozzles is in fluid communication with a corresponding single venturi assembly of the plurality of venturi assemblies.

In another embodiment of the present disclosure, an air manifold system for supplying a plurality of seed metering flow control devices with an agricultural product further comprises a reservoir selected from a group comprising: a local hopper, a tube, a y-connector.

DETAILED DESCRIPTION OF THE EMBODIMENTS OF THE PRESENT DISCLOSURE

Improved Roller Assembly

Figure 1:
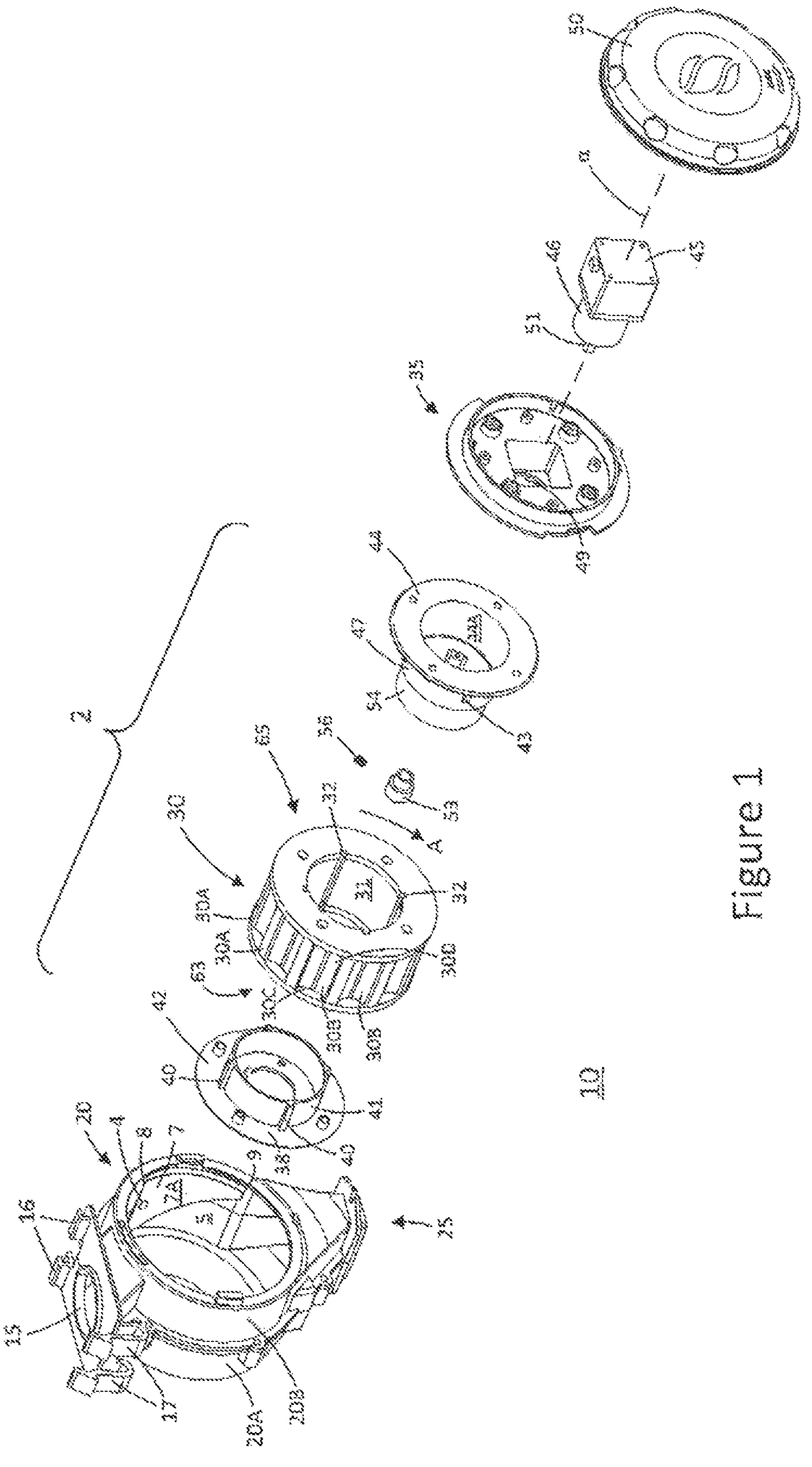
FIG. 1 is an exploded front perspective view of an embodiment of a metering assembly.

A preferred embodiment of the present disclosure is illustrated in FIG. 1. As may be seen in FIG. 1, a metering assembly 10 is provided, comprising a metering housing 20 comprising an inlet 15, an outlet 25, an inner surface 5 and an angled discharge 7 disposed or formed against the inner surface 5 of the metering housing 20. Angled discharge 7 may for example be attached to interior surface 5 of the metering housing 20 by means of a bolt, screw, or other suitable fastener known to a person skilled in the art for securing the angled discharge 7 to the interior surface 5 of the metering housing 20. Angled discharge 7 may also be formed as part of housing 20. The metering housing 20 also comprising a pair of mounting brackets 16 and quick release clips 17, disposed around the inlet 15 of metering housing 20, the brackets 16 and clips 17 used to affix the inlet 15 to a localized hopper, a y-connector or other space (not shown) for containing a small reserve of agricultural product adjacent the inlet to the metering housing.

The metering assembly 10 also comprises a roller 30 that is constructed of a resilient material, such as a high-density polyurethane foam, or any other suitable material known to a person skilled in the art. In an embodiment, the roller 30 is in the shape of a cylinder, adapted so as to fit snugly within the interior cavity the metering housing 20, such that the curved surface the cylindrical roller 30 is in contact with, and biased against, the surface 7A of angled discharge 7 and contact portion 5A of inner surface 5 of housing 20, and does not contact the remainder of the interior surface of housing 20. The roller 30 is supported on a first end 63 by a rear roller retainer 42 and on a second end 65 by a front roller retainer 44.

The rear and front roller retainers 42, 44 are adapted so as to couple with the inner surface 31 of the roller 30. In a preferred embodiment, the interior surface 31 of the roller 30 includes a plurality of retaining grooves 32, which mate in splined engagement with a corresponding plurality of retaining flanges 40 disposed along the outward surface of an annular collar 41 projecting from surface 38 of the rear roller retainer 42. Similarly, a corresponding plurality of retaining flanges 43 along the outer surface of the annular collar 47, which protrudes from the surface of the front roller retainer 44, mate with grooves 32.

Figure 2:
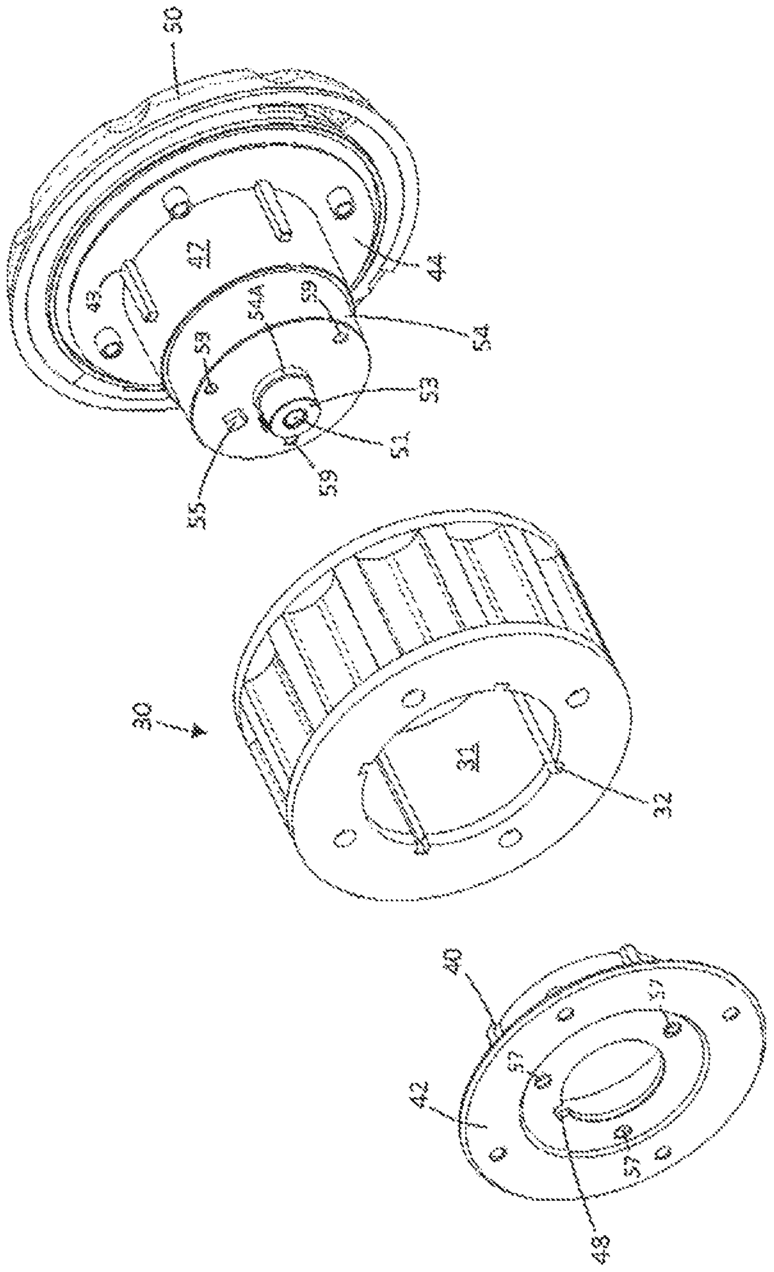
FIG. 2 is a partially exploded rear perspective view of an embodiment of a roller assembly and motor housing.

As may be better seen in FIGS. 1 and 2, a stepper motor 45 is provided which drives a drive shaft 46. The stepper motor 45 is supported within the motor housing 35, which motor housing 35 is secured to the front roller retainer 44, positioning the stepper motor 45 adjacent the inner surface 44A of front roller retainer 44. The front roller retainer 44 comprises an annular collar 47 and a cup 54 adjacent the annular collar 47. The drive shaft 46 extends through an annular opening 49 of the motor housing and through the annular collar 47 of front roller retainer 44, and rests within the cup 54. End 51 of drive shaft 46 extends through opening 54A of cup 54, and shaft collar 53 is fitted over end 51 and secured to end 51 by means of a screw 56 or other suitable means. A key 55 on cup 54 mates with a keyway 48 in rear roller retainer 42 so that rotation of the drive shaft 46 and corresponding rotation of the front roller retainer 44 by the stepper motor 35 also rotates rear roller retainer 42 and the roller 30 sandwiched therebetween. A plurality of bolt holes 57 correspond with a plurality of bolt holes 59 on the cup 54 of front roller retainer 44, which enables rear roller retainer 42 to be secured to the front roller retainer 44. Thus, when stepper motor 45 is energized, torque is provided to drive shaft 46 which causes the entire roller assembly 2 to rotate within the metering housing 20.

A cap 50 is secured to the motor housing 35 by means of a complementary threading arrangement disposed along the circumference of the cap 50 and the circumference of the motor housing 35. The cap 50 thus protects stepper motor 45 from contamination by water, dirt, or other particles. The cap 50, combined with the arrangement of the stepper motor 45 facing outward of the metering housing 20, results in an improved design whereby the stepper motor 45 is more readily accessible by a user of the metering device, such that the user may more easily work on clearing a blockage or otherwise performing maintenance on a particular stepper motor 45 within the array of stepper motors being used by the entire metering device. For an example, in a preferred embodiment, the array of stepper motors may include up to 360 stepper motors distributed across 60 different metering pods.

Figure 2A:
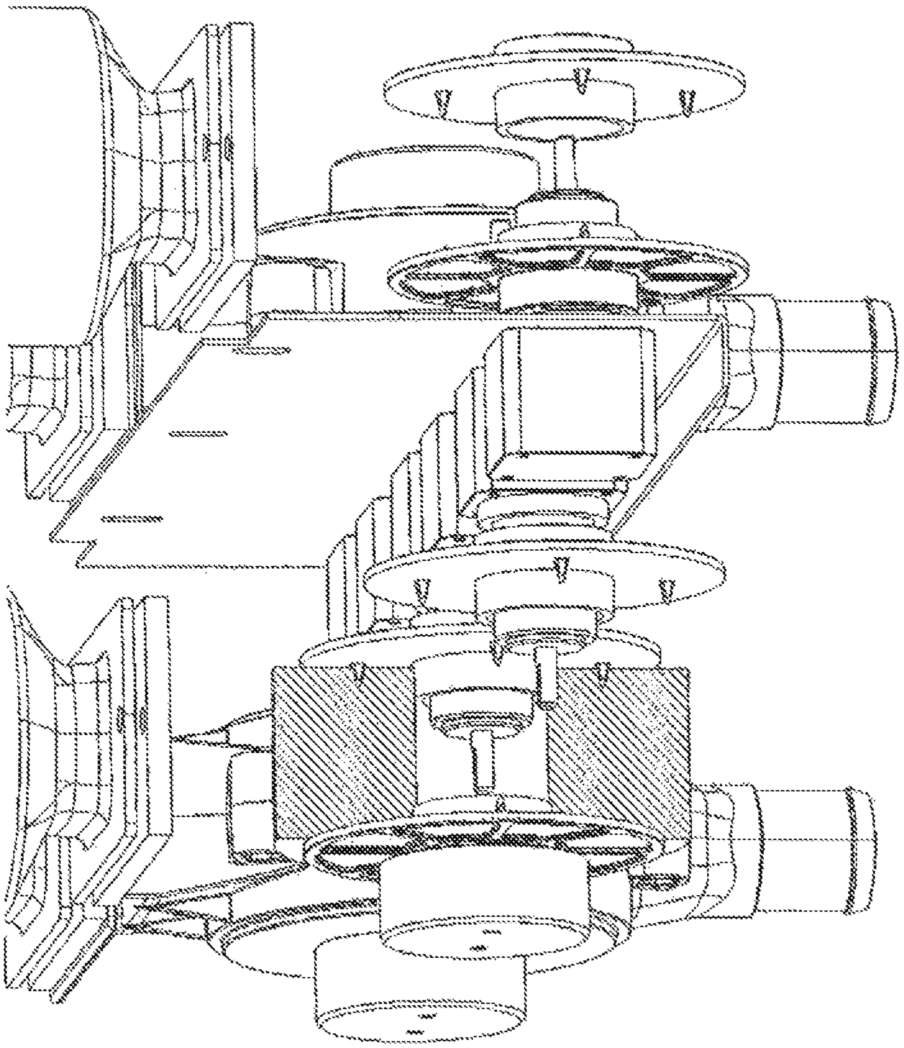
FIG. 2A is, in rear perspective, a partially cut-away view of a prior art metering assembly, with three of the metering assemblies' roller housings removed and with the rollers removed or cut away, showing the stepper motors in relation to the metering assemblies.
Figure 2B:
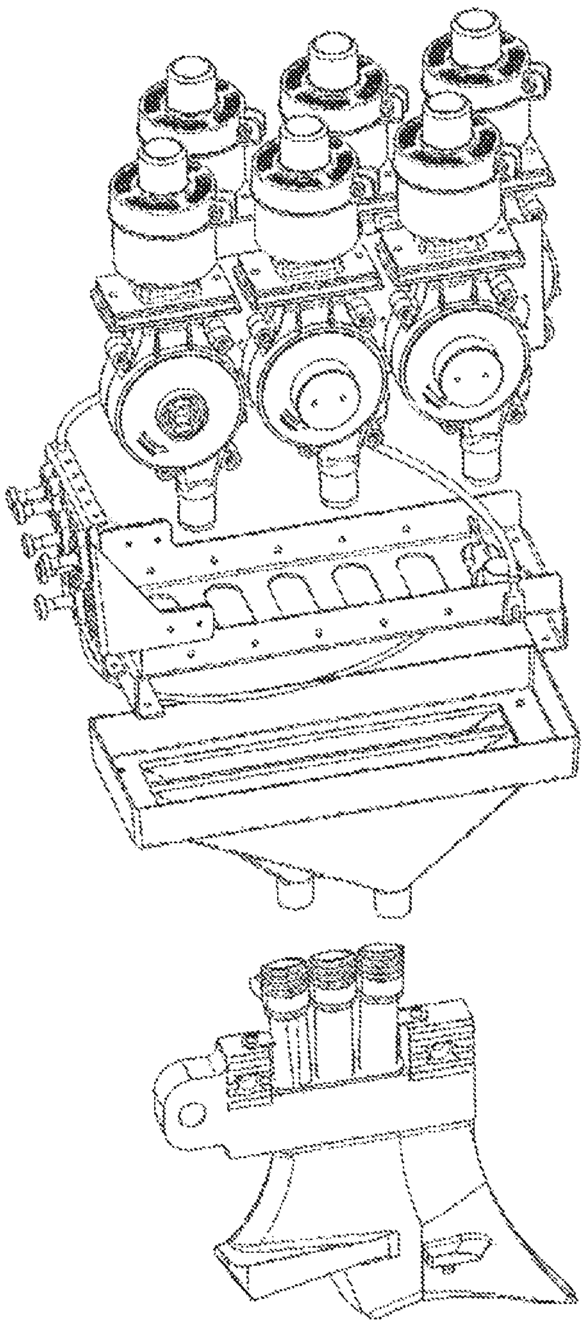
FIG. 2B is a side-on, partially exploded and cut-away top perspective view of prior art metering assemblies, with local hoppers disposed above the metering assemblies.

In addition, the stepper motor 45 is secured within the motor housing 35, which motor housing 35 projects towards the rear portion 20A of metering housing 20, thereby locating the entire motor 45 including the drive shaft 46 adjacent the inner surface 44A of the front roller retainer 44 which is adjacent the inner surface 31 of roller 30. As compared to the prior art metering assemblies, in which the stepper motors were located more or less entirely outside the metering assemblies, with a drive shaft of each stepper motor extending into the metering assembly to drive the roller assembly, this new arrangement of locating the stepper motor entirely within the metering housing provides the advantage of bringing the metering assemblies in closer proximity with respect to one another within a metering cluster, thereby reducing the size and increasing the resolution of each metering cluster, assuming the clusters are packed side-by-side, as well as the overall resolution of the applicator. A prior art arrangement, taken from application no. '449, showing the position of the stepper motors relative to the metering assemblies is found in FIG. 2A.

Figure 3:
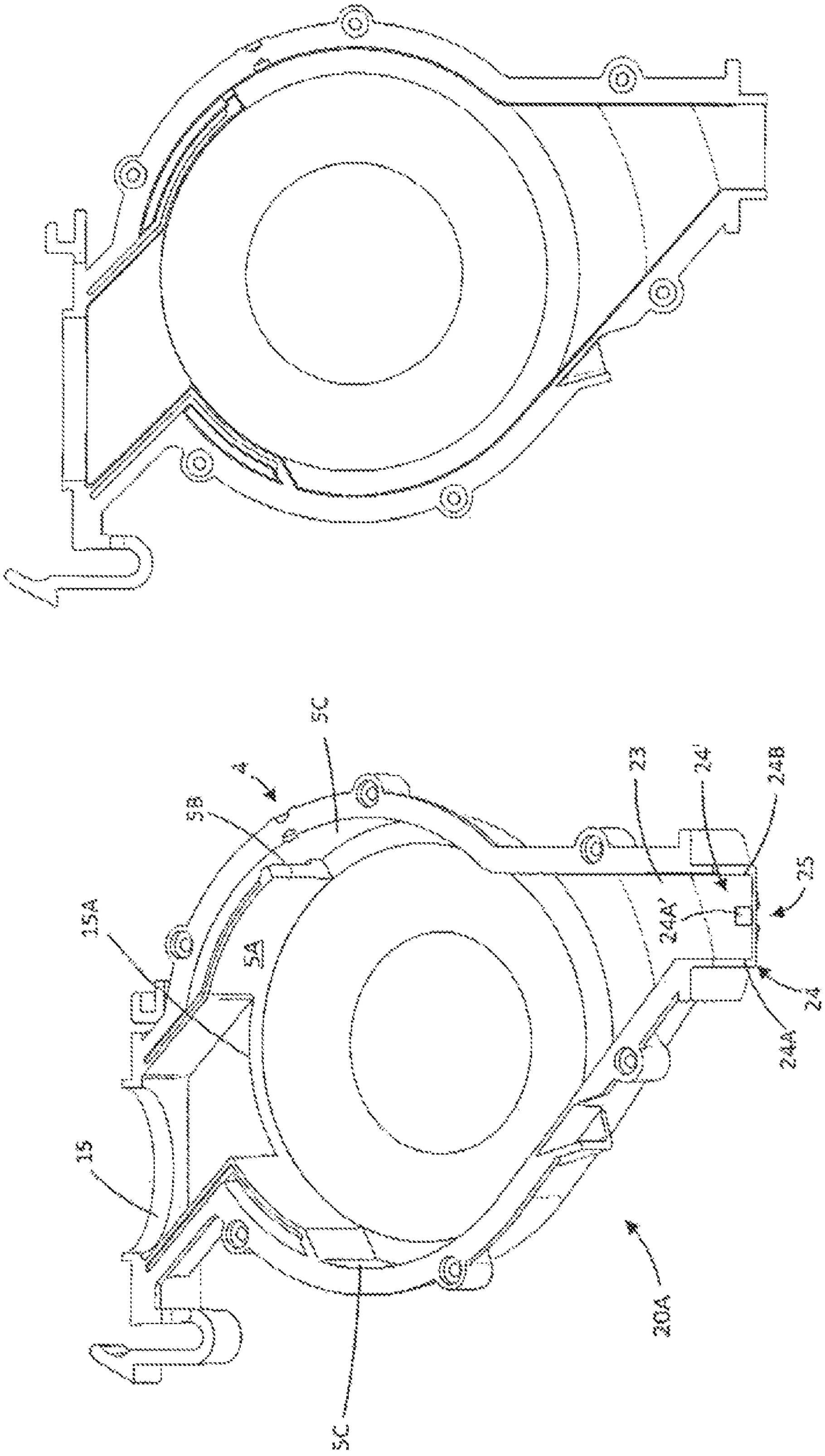
FIG. 3 is a perspective view of the rear portion of an embodiment of a metering housing.
Figure 4:
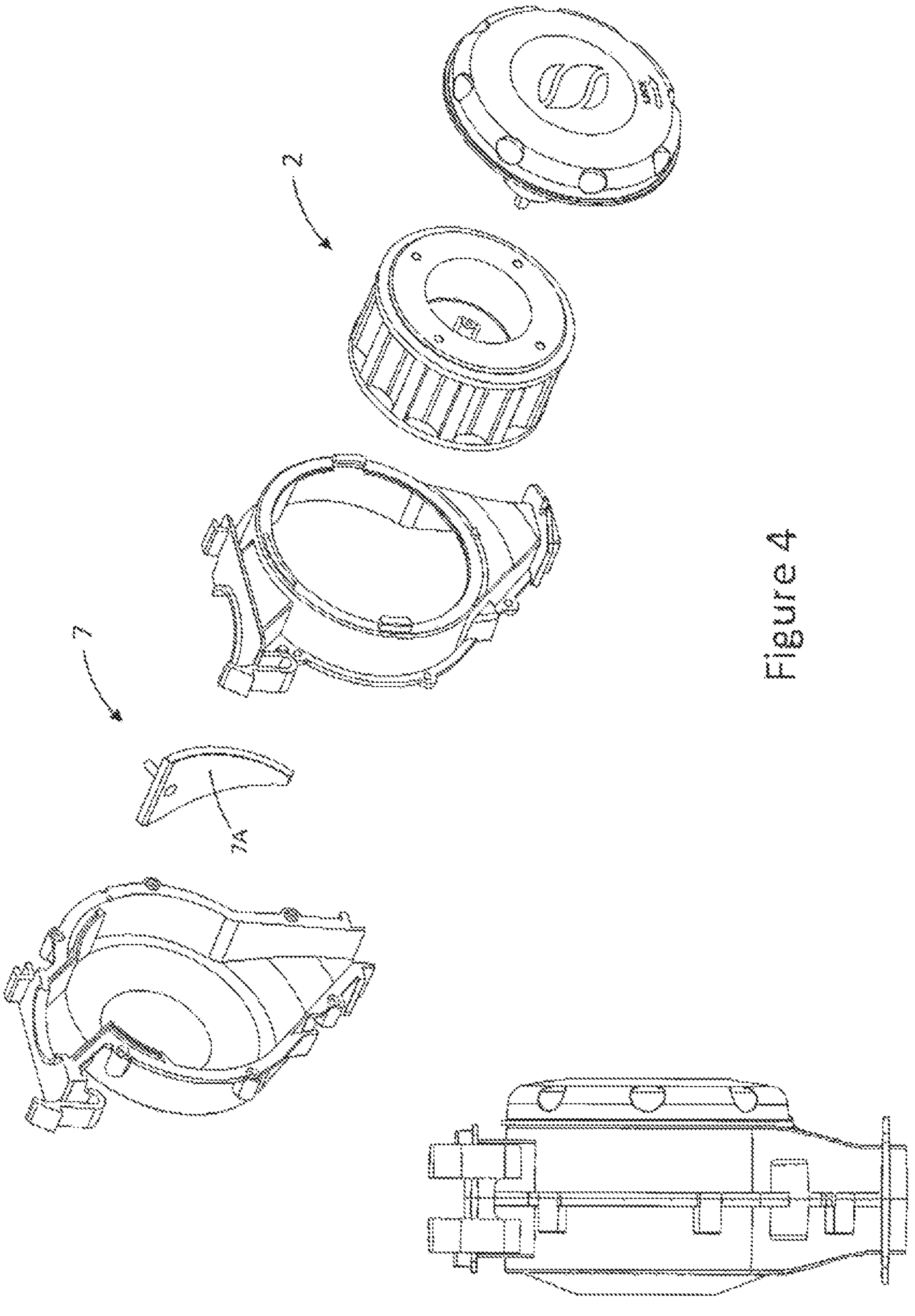
FIG. 4 is a perspective view of an embodiment of a metering assembly, partially exploded to show the angled discharge detached.

As may be seen in FIGS. 3 and 4, and in which housing 20 is shown with angled discharge 7 removed, the inner surface 5 of metering housing 20 comprises a contact portion 5A, a non-contact portion 5C, and a lip 5B therebetween. When mounting the angled discharge 7 in housing 20, as shown in FIG. 1, angled discharge 7 is positioned within the interior of the metering housing 20 such that the broad edge 8 of angled discharge 7 is adjacent to the lip 5B of the inner surface 5. A bolthole 4 is provided on a non-contact portion 5C adjacent the lip 5B, which complements the bolthole 4 which extends through angled discharge 7, fastening attachment of the angled discharge 7 to the body of the metering housing 20.

As may be seen in FIG. 1, when the angled discharge 7 is mounted within the metering housing 20, the roller 30 only comes into contact with the angled discharge 7 and the contact portion 5A of the inner surface 5 of the metering housing 20. This arrangement reduces the contact area between the inner surface 5 of the metering housing 20 and the surface of the roller 30, which beneficially reduces the amount of friction between the roller and the metering housing 20, as opposed to the prior art arrangement wherein a significantly greater portion of the surface of the roller is in contact with the inner surface of the metering housing 20. Reducing the overall amount of friction between the roller 30 and the metering housing 20 advantageously results in lesser power required to drive the stepper motor 45 and the roller 30, thereby resulting in energy savings for driving the entire metering device which, as previously mentioned, in an embodiment may include 360 stepper motors operating at a given time.

A further advantage of the reduced contact between the surface of the roller 30 and the inner surface 5 of the metering housing 20 is a significant reduction of the areas within the metering housing 20 where a blockage or jam may occur, caused by clumping granular agricultural material or foreign objects that become trapped between the inner surface 5 and the surface of the roller 30, as there is a reduced amount of surface area of the roller 30 in direct contact with the inner surface 5.

As may be seen in FIG. 1, a roller 30 rotates in direction A about an axis of rotation $\alpha$. The surface of the roller 30 is comprised of a radially spaced-apart array of contact surfaces 30A, having interleaved therebetween a corresponding array of channels 30B. The channels 30B extend longitudinally across the surface of roller 30, substantially from the first end 63 to the second end 65 of roller 30.

As the roller 30 rotates in direction A within the metering housing 20, the plurality of contact surfaces 30A come sequentially into contact with the contact portion 5A of the inner surface 5 and the surface 7A of the angled discharge 7 disposed within the metering housing 20. As roller 30 rotates in direction A, channel 30B becomes exposed to the opening 15A of inlet 15, allowing granular agricultural product flowing through the inlet 15 to enter channel 30B. As roller 30 continues its rotation, channel 30B becomes enclosed by the contact portion 5A of the inner surface 5 of the metering housing 20, thereby containing granular product within the cavity defined the channel 30B, contact surface 5A, and the surface 7A of angled discharge 7.

The surface 7A of angled discharge 7A gradually tapers from the broad edge 8 towards the narrow edge 9. Thus, as a first portion 30C of channel 30B passes along the surface 7A of the angled discharge 7, an opening to the cavity gradually forms as the surface of the angled discharge 7 becomes more narrow, thereby gradually allowing agricultural product to flow out of the cavity and into a channel bounded by the noncontact portion 5C of the inner surface 5 and the channel 30B. This channel flows into outlet 25 of metering housing 20, thereby allowing the agricultural products to flow out of a cavity of the roller 30 and into the outlet 25 whereby the agricultural product exits the metering housing 20 and enters the opener (not illustrated). This gradual exposure of the cavity, bounded by channel 30B, the contact portion 5A and the surface 7A of angled discharge 7, to the channel that leads to the outlet 25 of the metering housing 20 enables the gradual, steady flow of the agricultural product from a cavity of the roller 30 into the opener, rather than dropping pockets of agricultural product within the cavity into the opener in a pulsating flow pattern. Meanwhile, as the roller 30 continues to rotate, the second portion 30D of channel 30B comes into contact with the opening 15A of the inlet 15, which blocks further agricultural product from falling into the cavity of the roller 30. The roller 30 continues to rotate in direction A, exposing a first portion 30C of the sequentially next channel 30B of the roller 30 to the opening 15A of inlet 15, thereby providing a new cavity into which the agricultural product will continue to flow, and be carried along by, the rotational motion of the roller 30 towards the outlet 25.

Improved Process Control for Driving the Stepper Motor

A blockage controller system comprises a series of blockage sensors deployed throughout each metering assembly, and a processor which receives signals from each blockage sensor and combines the blockage sensor data with the StallGuard™ data (example, the SG value described below) to better detect or predict onset of a stall condition of a stepper motor 45. In one preferred embodiment not intended to be limiting, nine pairs of blockage sensors 24 are deployed within each metering pod. The blockage sensors 24 may be any type of sensor suitable for detecting the presence of material within the metering pod, such as for example a photoelectric sensor comprising a light transmitter 24A and a photoelectric receiver 24B. As illustrated in FIG. 3, a pair of blockage sensors 24, 24', each sensor comprising of a transmitter 24A and a receiver 24B, are positioned within the interior surface of the chute 23, through which chute the agricultural product exits the metering housing 20 and enters an opener of the metering cluster. In an embodiment, each of the two blockage sensors 24, 24', comprising a light transmitter 24A positioned on one side of the interior of the chute 23, and a photoelectric receiver 24B positioned opposite the light transmitter 24A within the interior of the chute 23, with the light transmitter 24A' and photoelectric receiver 24B' of the second sensor 24' positioned within the interior surface of the chute 23 so as to be substantially orthogonal (set apart by 90°) with respect to the sensor 24. Note however, regarding sensor 24' in FIG. 3, only the transmitter 24A' is illustrated, it being understood that the second sensory receiver 24B' would be facing transmitter 24A' so that the sensor 24, 24' transmission paths criss-cross.

Thus, as an example, not intended to be limiting, if material is not flowing through chute 23, the light emitted by the light transmitter 24A will no longer be blocked by the flowing agricultural product, resulting in a non-attenuated light signal being received by a photoelectric receiver 24B. In this manner, the absence of flowing agricultural product in the chute 23 may be detected by the blockage sensor 24. The second blockage sensor 24' positioned within the same chute 23 improves accuracy of detection of flowing agricultural product; for example, in the case of an uneven flow stream which flows through the chute 23 without crossing substantially into the detection range of the first blockage sensor 24 would then likely be detected by the second blockage sensor 24', thereby decreasing the probability of a false reading indicating no product is flowing from chute 23. A further three blockage sensors 24 may be positioned within one or more, or each of the three outlets of the opener, so as to detect any blockages that may be occurring within the opener assembly. An illustration of an opener is found in FIG. 28, which is from application no. '449.

An integrated circuit utilized within an electronic controller for driving the stepper motor 45, such as for example the StallGuard™ provided in electronic controllers manufactured by Tectronic™, works, as applicant understands it, by monitoring the back EMF and other variables of the stepper motor 45 so as to produce a mathematical load value which represents the load on the stepper motor 45 at a given point in time (referred to as the SG value). For example, the SG value may be a non-zero value representing no load on the stepper motor 45. At other times the SG value may approach a value close to zero, which represents the stepper motor 45 is at a maximum load and therefore nearing a stall condition.

Figure 6:
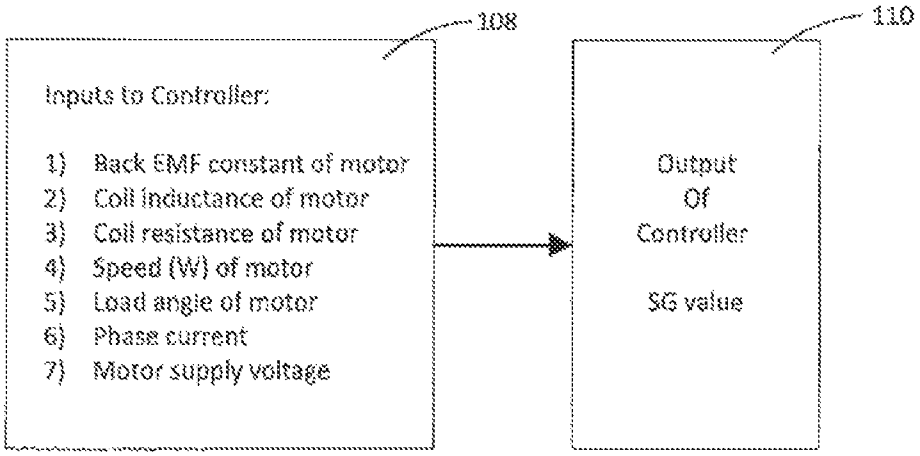
FIG. 6 is a logic flow diagram, showing the inputs and outputs for the integrated circuit on an electronic controller for controlling a stepper motor, known in the prior art.

More specifically, in an embodiment of the present disclosure as illustrated in FIG. 6, the inputs 108 to the integrated circuit of the electronic controller include: the back EMF constant of the stepper motor 45; the coil inductance of stepper motor 45; the coil resistance of stepper motor 45; the rotational speed of the stepper motor 45; the load angle of stepper motor 45; the phase current of stepper motor 45; and the supply voltage of stepper motor 45. These inputs 108 are either provided to the integrated circuit of the electronic controller as static variables, or in the case of the dynamic variables, the dynamic variables are continuously monitored by means known to a person skilled in the art and communicated to the integrated circuit of the electronic controller, which receives the inputs 108, applies an algorithm to the inputs 108 and produces an output 110. Specifically, output 110 is a numerical value representing the operating condition of stepper motor 45, referred to as the SG value.

Figure 5:
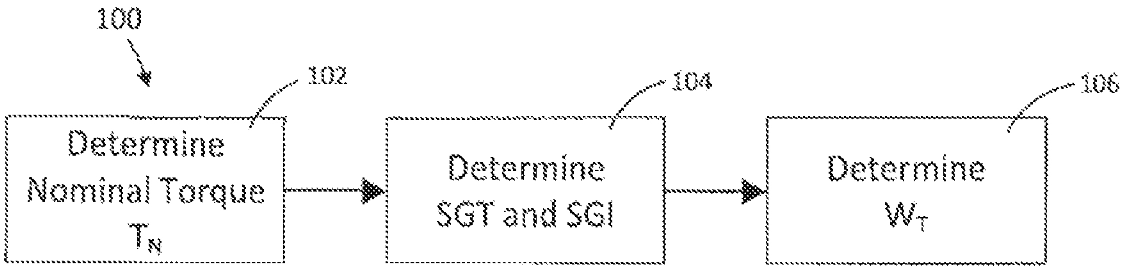
FIG. 5 is a logic flow diagram, showing the procedure of an embodiment for tuning the control system for an agricultural product applicator.

To obtain the parameters required for implementing improved electronic controlling of each stepper motor 45 in the flow control system, it is necessary to first perform a number of tuning procedures with respect to the operation of the stepper motor 45. As illustrated in FIG. 5, the tuning procedure 100 comprises the step 102 of determining nominal torque value ($T_N$) of the stepper motor 45; the step 104 of determining the threshold SG value (SGT) and near threshold SG value (SG1); and the step 106 of determining the threshold rotational velocity ($\omega_T$) of the stepper motor 45.

Figure 7:
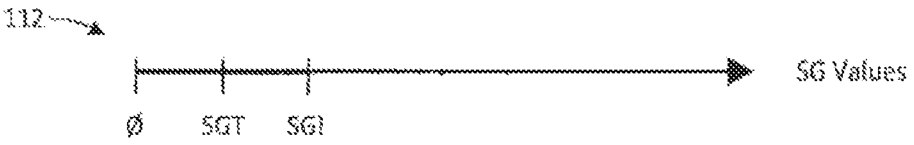
FIG. 7 is a line diagram, showing the range of SG values utilized by the integrated circuit in accordance with an embodiment.

With respect to step 102, through tuning procedures known to a person skilled in the art, one determines the magnitude of torque required to drive a stepper motor 45 in a metering assembly 10 under normal operating and product flowing conditions. This magnitude is then assigned as the value of the nominal torque parameter ($T_N$) in the control system. For example, not intended to be limiting, a nominal torque value for a stepper motor (45) may have a magnitude of 8 inch pounds force (in·lb). As illustrated in FIG. 7, a range of SG values 112 includes an SG value of zero or substantially at zero, indicating that a stepper motor 45 is stalled, a threshold SG value (SGT), which may be either less than zero or greater than zero, and a near threshold SG value (SG1), which is greater in magnitude than the SGT value (regardless of whether SGT and SG1 are greater than, or lesser than, zero).

Regarding step 104, of determining the SGT and the SG1 values, firstly the threshold SG value (SGT) is determined, which value represents that the stepper motor 45 is nearing a stall condition. Determining the SGT parameter is accomplished by procedures known to a person skilled in the art, for example, by following the procedures outlined in the StallGuard™ technical documentation provided by the manufacturer of an electronic controller for a stepper motor featuring an integrated circuit which monitors for increased loads on a controlled stepper motor, and increases the torque of the stepper motor in response to an increased load. Once the SGT parameter has been determined, a person skilled in the art will select a near threshold SG value (SG1), which is incrementally greater in magnitude than the SGT value, and close enough in magnitude to the SGT value so as to indicate that the stepper motor 45 nearing the threshold of a stall condition. Finally, the step 106 of determining the rotational velocity threshold ($\omega_T$) involves determining the rotational velocity of the stepper motor 45 at which monitoring for potential stall condition becomes necessary. In other words, when the motor 45 is driven at velocities below the rotational velocity threshold ($\omega_T$), there is no possibility of a stall occurring, and so it is not necessary for the electronic controller to continually monitor the operation of the stepper motor 45. Once the stepper motor 45 reaches the threshold rotational velocity ($\omega_T$), it is at that point that the electronic controller will begin monitoring the condition of the stepper motor 45, which procedure is further explained below.

Figure 8:
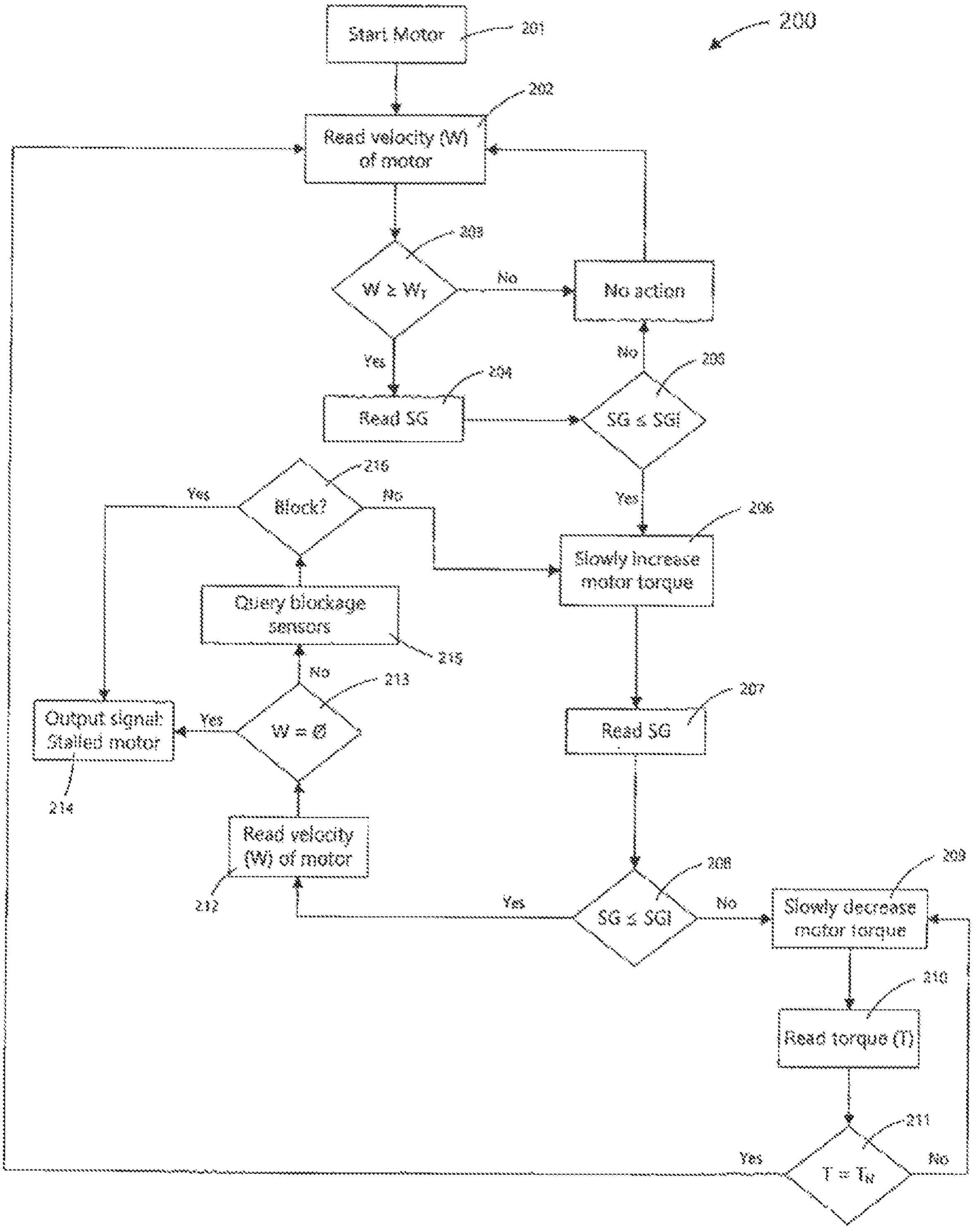
FIG. 8 is a logic flow diagram, showing an embodiment of a procedure for monitoring and controlling a stepper motor in a metering assembly.

FIG. 8 illustrates, in one embodiment of the present disclosure, not intended to be limiting, a procedure 200 for monitoring and controlling a stepper motor 45 in a metering assembly 10. Procedure 200 comprises step 201, starting a stepper motor 45. Step 202 comprises reading the rotational velocity ($\omega$) of the stepper motor 45. Step 203 comprises comparing the measured rotational velocity of the motor against a lookup table to determine whether the measured rotational velocity ($\omega$) of the motor is greater than, or equal to, the threshold rotational velocity ($\omega_T$) determined in step 106. If the rotational velocity ($\omega$) of the stepper motor is less than the threshold rotational velocity ($\omega_T$), the controller takes no further action and procedure 200 reverts to step 202 of measuring the rotational velocity of the motor.

Where the measured rotational velocity of the motor exceeds the threshold rotational velocity ($\omega_T$), the procedure goes to step 204 to read the SG value provided by the integrated circuit. In step 205, the measured SG value is compared against a lookup table, and if the measured SG value is greater than the near threshold value SG1 determined in step 104, no action is taken by the controller and the procedure 200 reverts to step 202 of reading the rotational velocity the stepper motor. However, in step 205 if the SG value, when compared to the lookup table is determined to be less than or equal to the near threshold value SG1, then the procedure goes on to step 206, comprising the electronic controller slowly, or incrementally, increasing the torque of the stepper motor 45. The terms "slowly" and "incrementally" are herein used interchangeably.

Once the torque has been increased by a predetermined amount, the procedure goes on to step 207, comprising querying the integrated circuit of the electronic controller for the SG value of the stepper motor 45. In step 208, if upon comparing the measured SG value to the lookup table, the SG value is determined to be greater than the near threshold value (SG1), then procedure 200 moves to step 209, comprising the electronic controller slowly decreasing the motor torque for a predetermined period of time.

In one embodiment of the present disclosure, in the control procedure described above and illustrated in FIG. 8, the step 206 of incrementally increasing the torque of the stepper motor 45 occurs approximately twice as frequently as the step 209 of incrementally decreasing the torque of the stepper motor 45, as there is a need for increasing the torque at a relatively higher rate (for example, in response to the motor 45 approaching a stall condition) than the rate at which the torque is subsequently decreased to the nominal torque value ($\tau_N$), in part so as to ensure that the torque remains at a sufficiently increased magnitude for a sufficient period of time so as to provide the power to the motor 45 required to clear a blockage and avoid a stall condition. For example, not intended to be limiting in any way, step 206 (of incrementally increasing the torque) may occur at a frequency of 20 Hz while step 209 (of incrementally decreasing the torque) may occur at a frequency of 10 Hz.

In step 210, the electronic controller measures the torque of the stepper motor 45 in accordance with procedures known to a person skilled in the art, and in step 211, the measured torque ($\tau$) is compared against a lookup table to determine whether the measured torque equals the nominal torque ($\tau_N$) previously determined in step 102. If the measured torque is not equal to the nominal torque ($\tau_N$), then the procedure 200 reverts to step 209, comprising the electronic controller slowly decreasing the motor torque. In performing step 211, where the measured torque of the motor is found equal to the nominal torque ($\tau_N$), the procedure 200 reverts to step 202 of continually monitoring the rotational velocity of stepper motor 45.

Returning to step 208, where the measured SG value is compared against a lookup table and determined to be less than or equal to SG1, then the procedure 200 goes to step 212 of measuring the rotational velocity ($\omega$) of the stepper motor 45, which may be accomplished by any means known to a person skilled in the art, such as for example by use of an encoder sensor on the roller assembly 2, which measures the rotational velocity of the roller assembly 2 that is substantially equivalent to the rotational velocity of the stepper motor 45. In step 213, the measured rotational velocity is compared against zero. If the measured rotational velocity of stepper motor 45 is equal to zero, then procedure 200 moves to step 214, comprising the electronic controller outputting a signal to indicate to the user that the stepper motor 45 has stalled. In an embodiment of the present disclosure, the output signal may include a visual signal, such as a blinking LED on an array of LEDs representing the operational status of the plurality of stepper motors 45 utilized in the system. In other embodiments, the signal may also include an audio signal which may be an alarm sound or a verbal message, indicating to the user the identity or location of the specific stepper motor 45 that has stalled.

Returning to step 213 of procedure 200, if the measured rotational velocity of the stepper motor 45 is determined to be non-zero, the procedure 200 moves to step 215, comprising the electronic controller querying the one or more blockage sensors deployed within the metering assembly 10 that contains the stepper motor 45 being monitored. In step 216 of procedure 200, if the data obtained from the blockage sensors in step 215 indicates there is presently no blockage within the metering assembly 10, then the procedure 200 goes to step 206 whereby the electronic controller continues to slowly increase the motor torque for a predetermined period of time, in an effort to return the stepper motor 45 to normal operating conditions.

On the other hand, if it is determined in performing step 216 that there is a block, as indicated by the lack of product flowing from the metering assembly 10, then it is likely that the stepper motor 45 will not resume normal operating conditions without intervening action by the user, in which case procedure 200 proceeds to step 214, in which the electronic controller outputs a signal indicating that the motor has stalled.

In an alternative embodiment, the output signal in step 214, upon determining that there is a block within the metering assembly 10, may include other types of visual and/or audio signals that specify other operating conditions of the motor, besides a stalled motor condition. For example, the output signal in step 214 may include an error message indicating that a block has been detected and the automated process for optimizing torque of the stepper motor by the electronic controller failed to return the stalled motor to normal operating conditions, in which case the user of the system may choose to either shut down the system in order to further investigate the stepper motor 45, or otherwise continue to operate the system until a true stall condition of the stepper motor has been detected.

In an embodiment, where a true stall condition occurs in a given stepper motor 45 that cannot be remotely corrected by the electronic controller via the application described above of increasing torque on the motor 45, the user interface for the electronic controller displays a visual signal indicating to the user the exact location of the stalled stepper motor 45. In a preferred embodiment, the visual signal may take the form of a flashing light in an array representing a map of the location of each stepper motor 45 within each metering pod, so as to quickly and easily convey to the user the exact location of the stalled stepper motor 45.

Improved Air Manifold Incorporating Venturi Assemblies

In an embodiment of the present disclosure, an improved air manifold 300 is provided to reduce or eliminate blockages in the product supply hoses that may occur when a local hopper, or other container or reservoir designed to hold a small reserve of agricultural product adjacent the metering assembly 10, has reached its product capacity due to the continual supply of product from a product hopper 301 to the individual metering assemblies 10.

Figure 9:
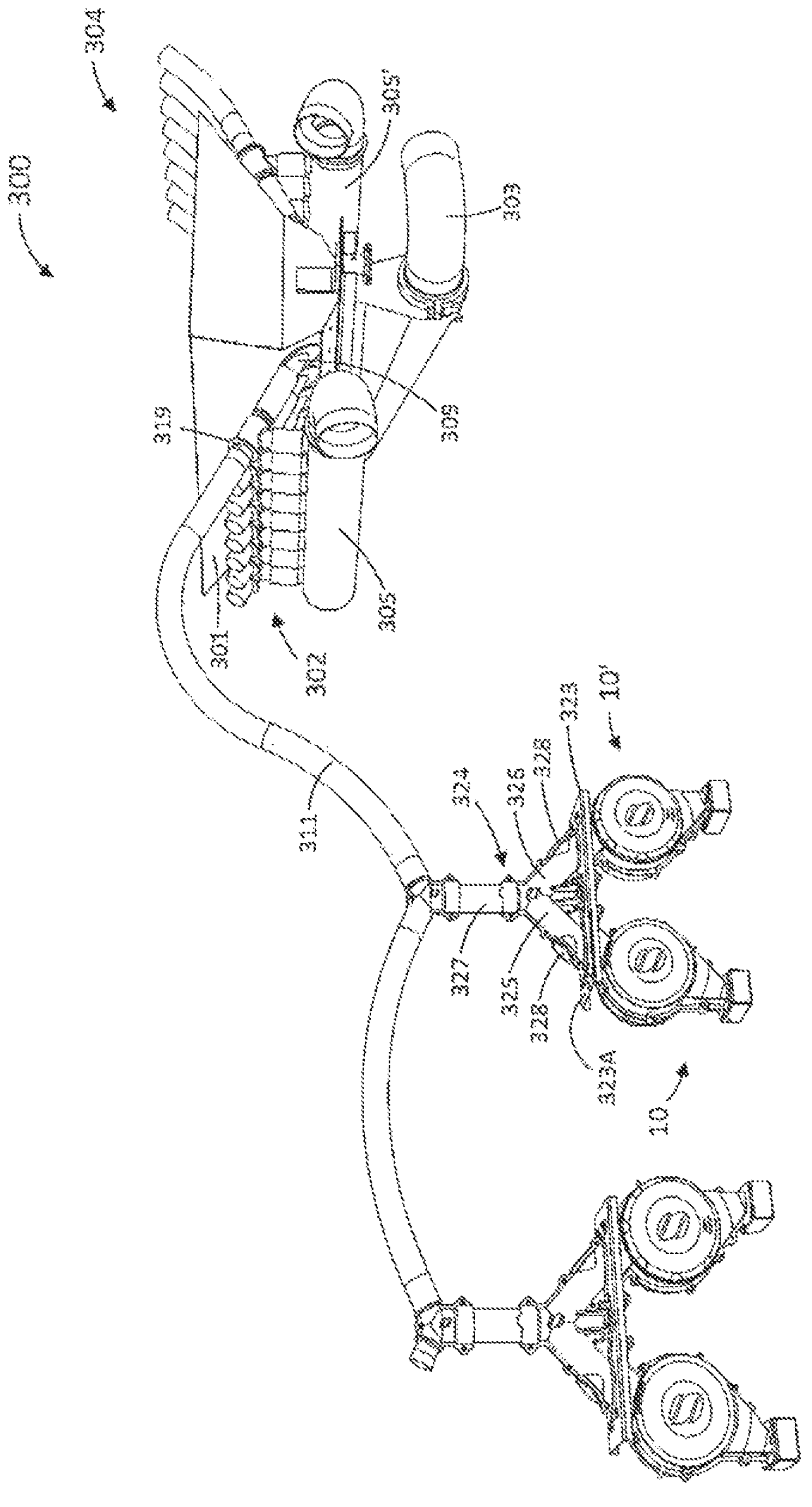
FIG. 9 is a perspective view of an embodiment of an air manifold, showing the fluid connection between a nozzle of the air manifold and a plurality of metering assemblies.
Figure 10:
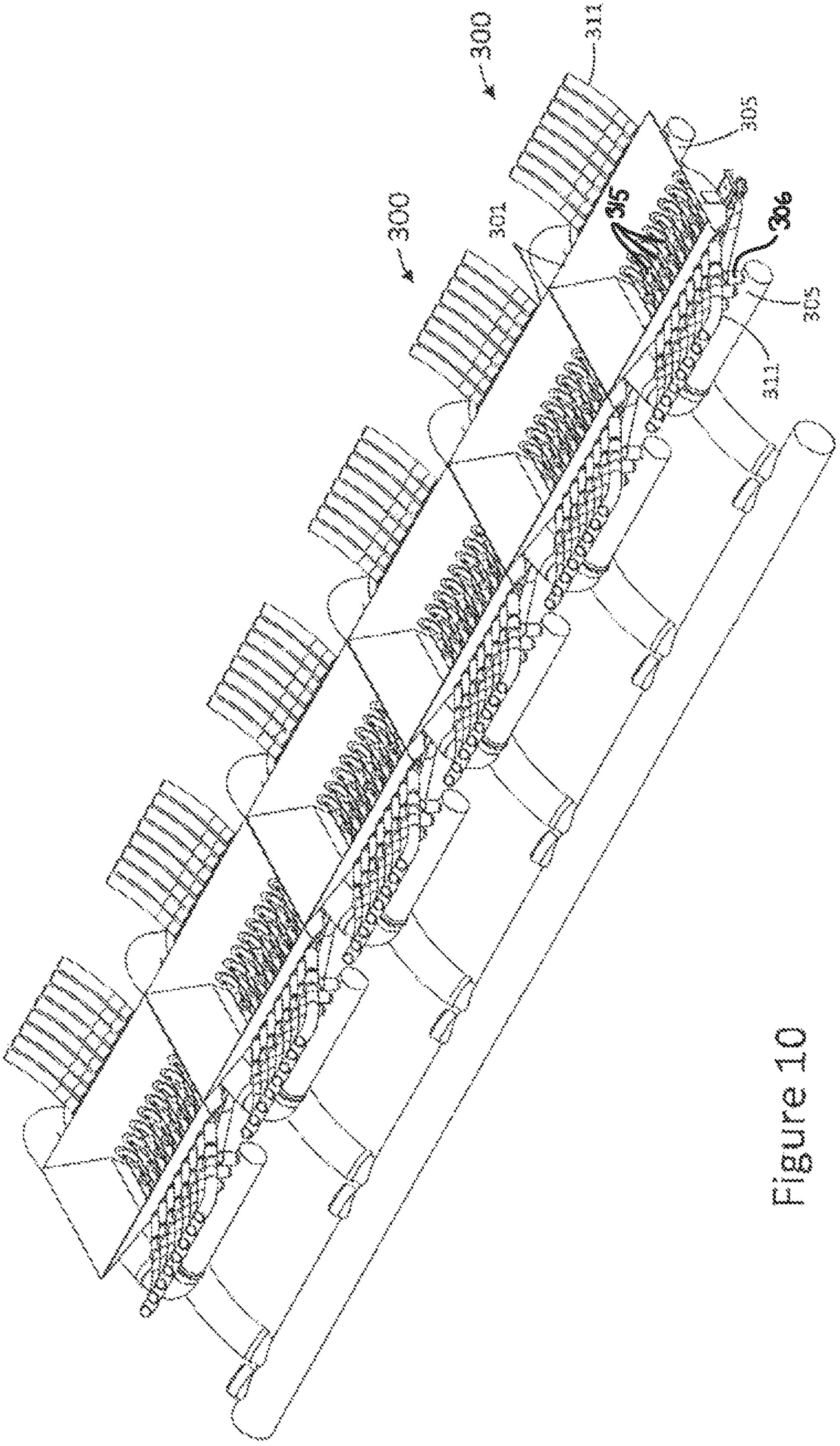
FIG. 10 is a perspective view of an embodiment of an air manifold, showing a plurality of air manifolds connected to nozzle and venturi plenums.

As illustrated in FIG. 9, in an illustration not intended to be limiting, a pair of metering assemblies 10, 10' are supported underneath a platform 323. Attached to the upper surface 323A of platform 323 are one or more containers or reservoirs 324 in fluid communication with one or more metering assemblies 10 coupled to the underside of platform 323. In this embodiment, not intended to be limiting, a container 324 for holding a reserve of agricultural product may include a y-connector 324 having a first branch 325 in fluid communication with a first metering assembly 10, and a second branch 326 in fluid communication with a second metering assembly 10'. Each branch of the y-connector 324 further comprises at least one screened vent 328 located, for example, on the end of each branch adjacent platform 323. The y-connector 324 further comprises a supply branch 327, forming the base of the "y", which is in fluid communication with each of the first and second branches 325, 326. Supply branch 327 is in fluid communication with a supply hose 311 coupled to a hose coupling 319, better seen in FIG. 11, in fluid communication with a venturi assembly 312. The venturi assembly 312, further described below, is in fluid communication with a product pickup nozzle 309 extending from an air manifold 300. Air manifold 300 comprises a product hopper 301 which is filled with the granular agricultural product to be supplied to a plurality of metering assemblies 10.

Figure 11:
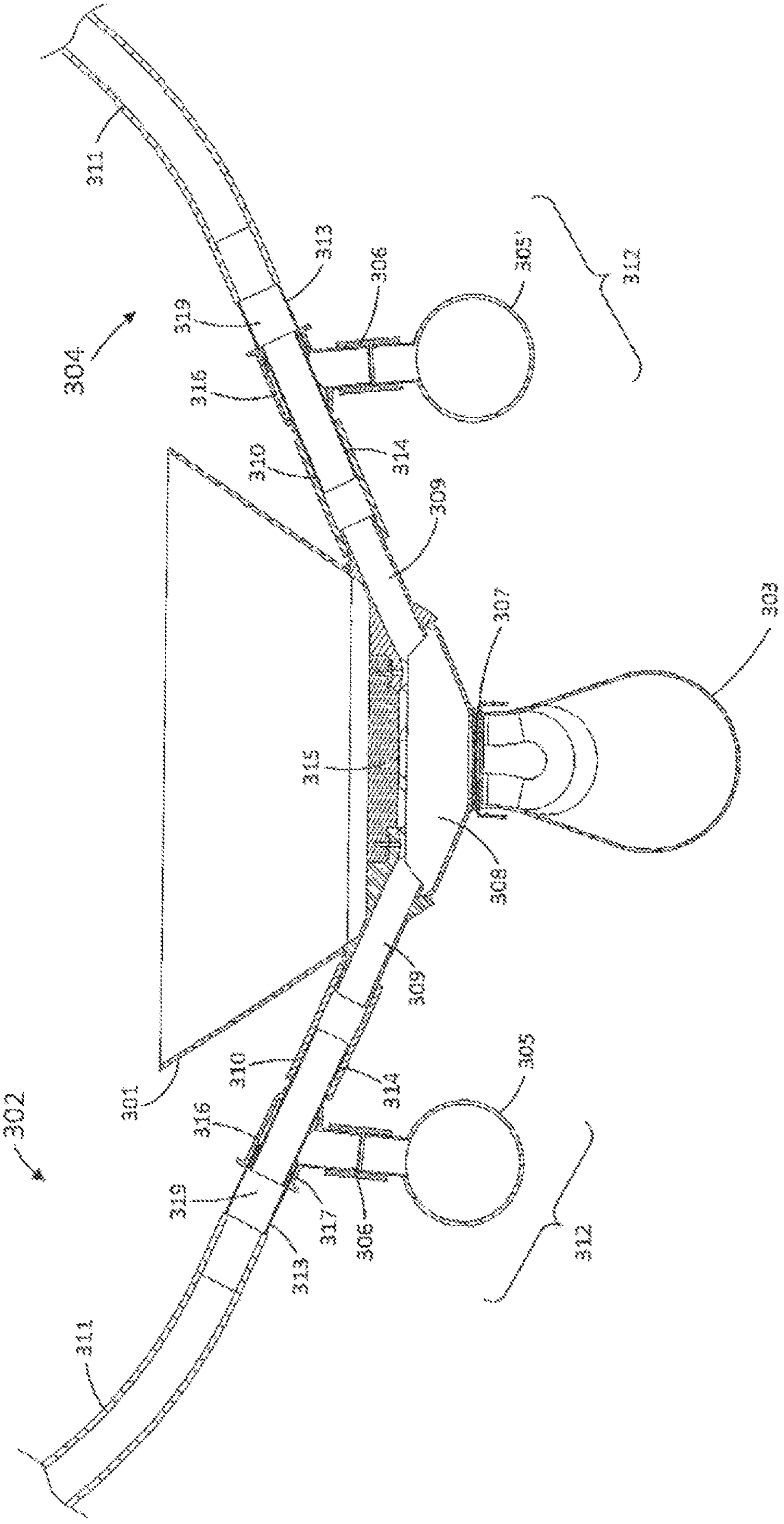
FIG. 11 is a cross-section front elevation view of an embodiment of an air manifold.
Figure 11A:
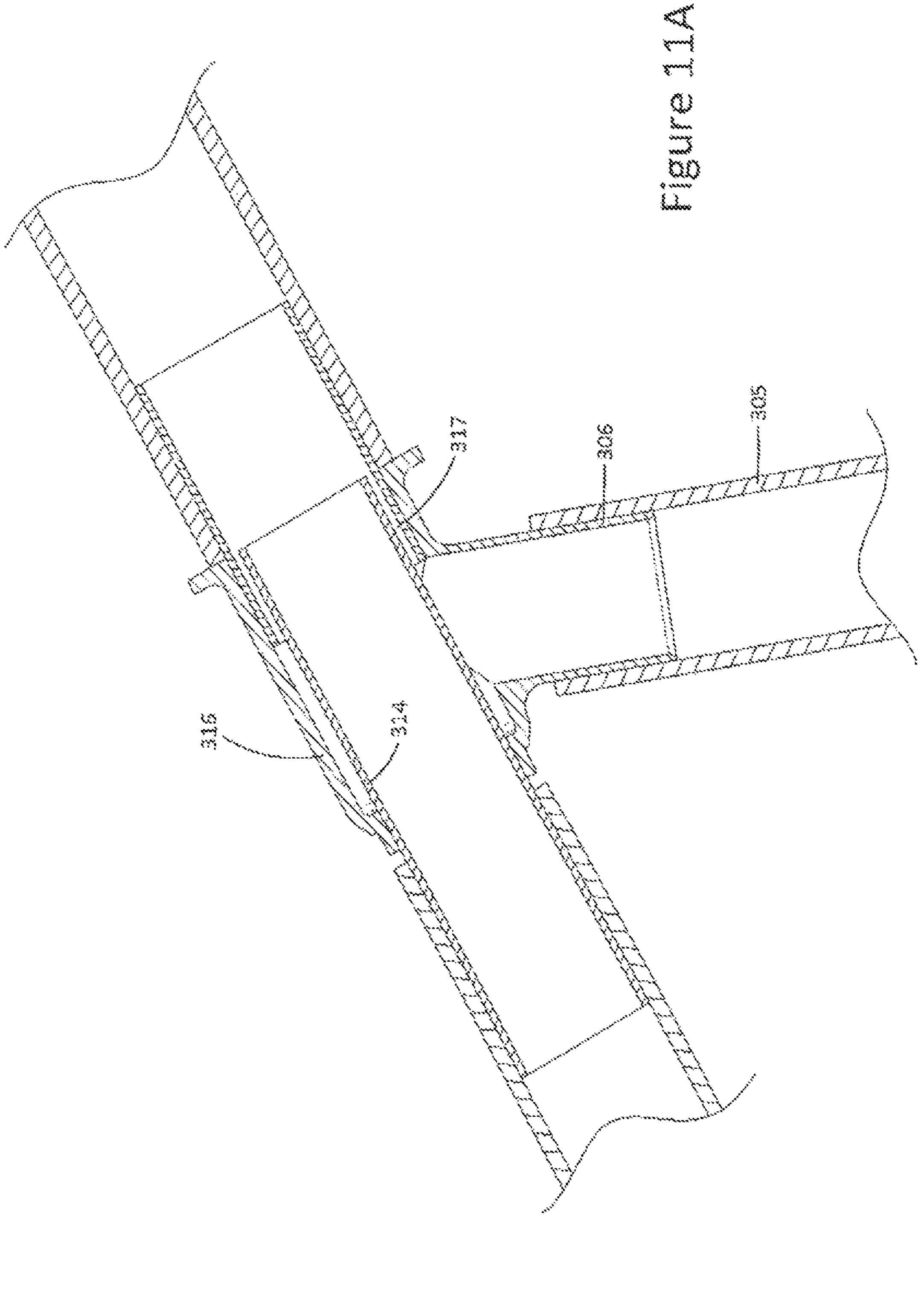
FIG. 11A is a close up of a portion of the air manifold illustrated in FIG. 11, showing details of a venturi assembly.

As illustrated in FIGS. 11 and 11A, in an embodiment of the present disclosure an air manifold 300 comprises product hopper 301 adapted for supplying granular agricultural product to a plurality of metering assemblies 10, a product flow cavity 308 positioned beneath the product hopper 301, and a nozzle connector apparatus 315 adapted for connecting a plurality of product pickup nozzles 309 to the product flow cavity 308, so as to enable fluid communication between the product flow cavity 308 and each of the plurality of product pickup nozzles 309. Positioned directly beneath, and adjacent to, the product flow cavity 308 is a nozzle plenum 303 through which a high pressure air stream is provided by a main air source 322, seen in FIG. 12. The high pressure air stream generated by the main air source 322 flows through one or more air ducts 318 to the nozzle plenum 303, and passes through a screen 307 into the product to flow cavity 308. In an embodiment, screen 307 is removable so as to facilitate cleaning of the product hopper 301. Disposed above the screen 307 within the product flow cavity 308 is the nozzle connector 315, which provides both a connection between the product flow cavity 308 and the plurality of product pickup nozzles 309, and serves as an agitator as described below.

When a high pressure air stream flows from the nozzle plenum 303 to the product flow cavity 308, granular agricultural product flowing downwardly from hopper 301 or residing within the product flow cavity 308 becomes agitated by the high pressure air stream deflecting off of the rigid cross-bar shape of the nozzle connector 315, thereby enabling granular agricultural product to become entrained within the high pressure air stream flowing from the nozzle plenum 303 into product flow cavity 308. The high pressure air stream, containing entrained agricultural product, then proceeds through the plurality of product pickup nozzles 309 and continues through a venturi assembly 312, flowing out of the hose coupling 319 and into a supply hose 311, from which the air stream, containing entrained agricultural product, flows into a plurality of metering assemblies 10 via y-connectors 324.

Figure 12:
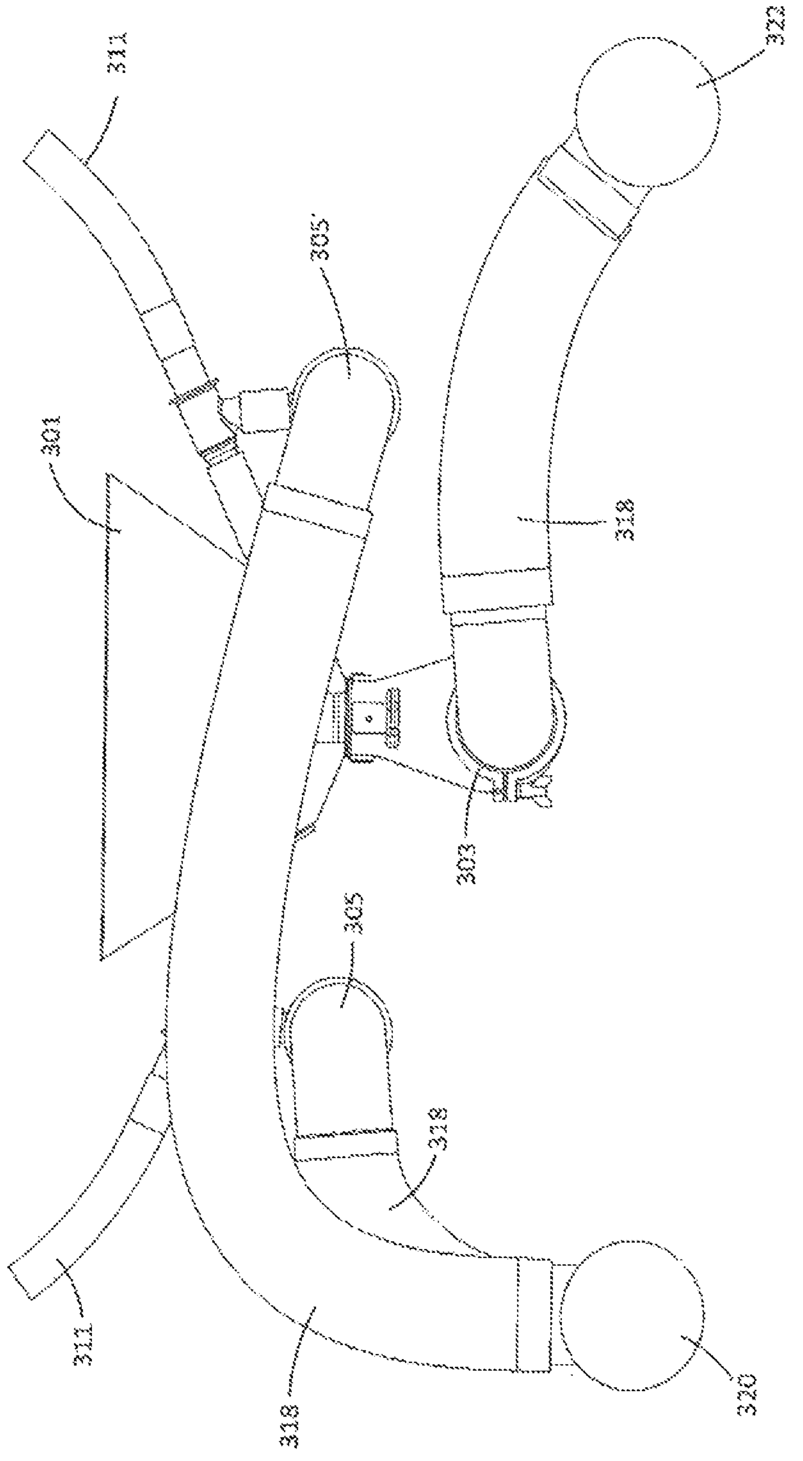
FIG. 12 is a front elevation view of an embodiment of an air manifold, showing the fluid connection between the air sources and the nozzle and venturi plenums.
Figure 13A:
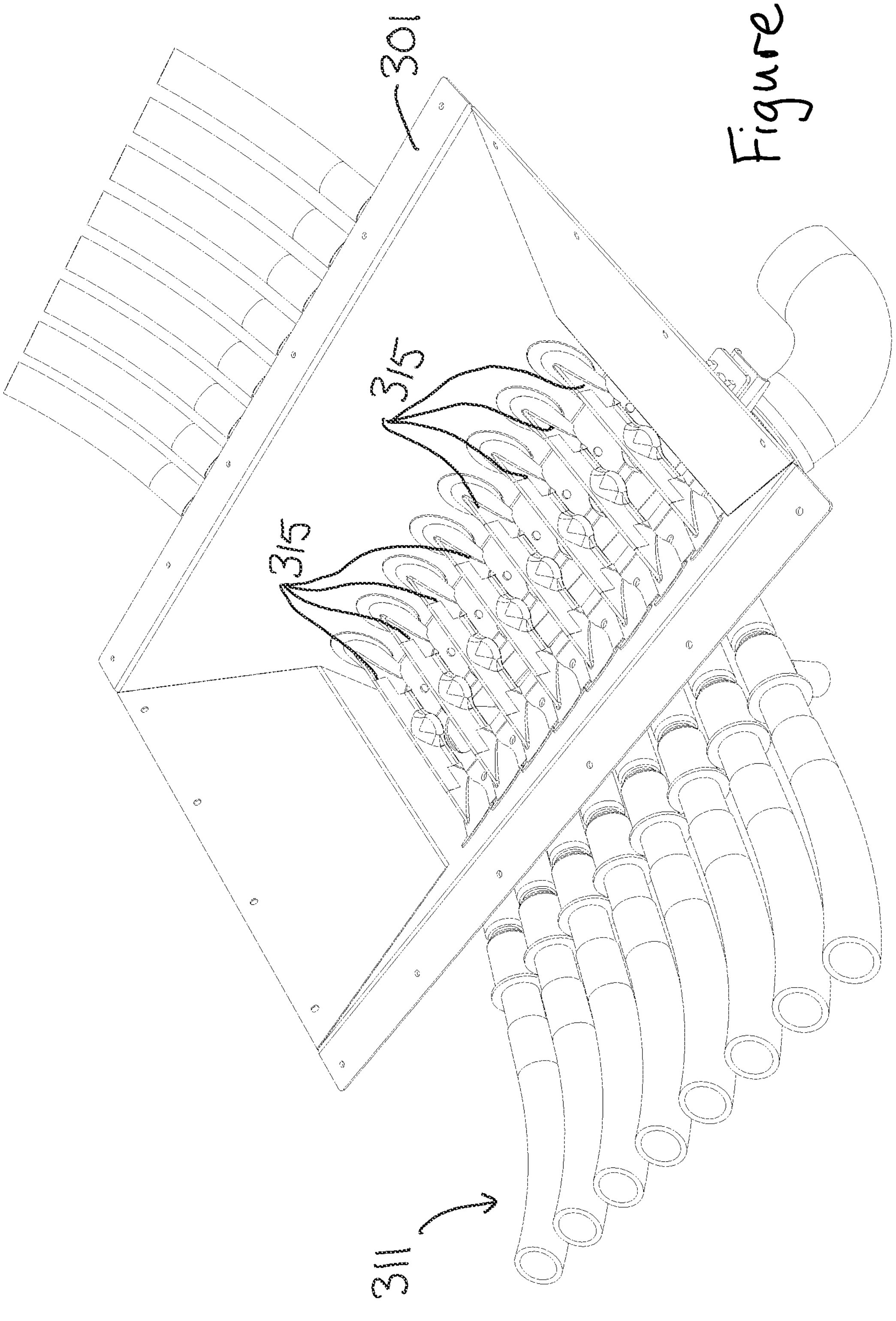
FIG. 13A is a perspective view of an embodiment of an air manifold, showing the nozzle connector mounted inside the hopper.
Figure 13B:
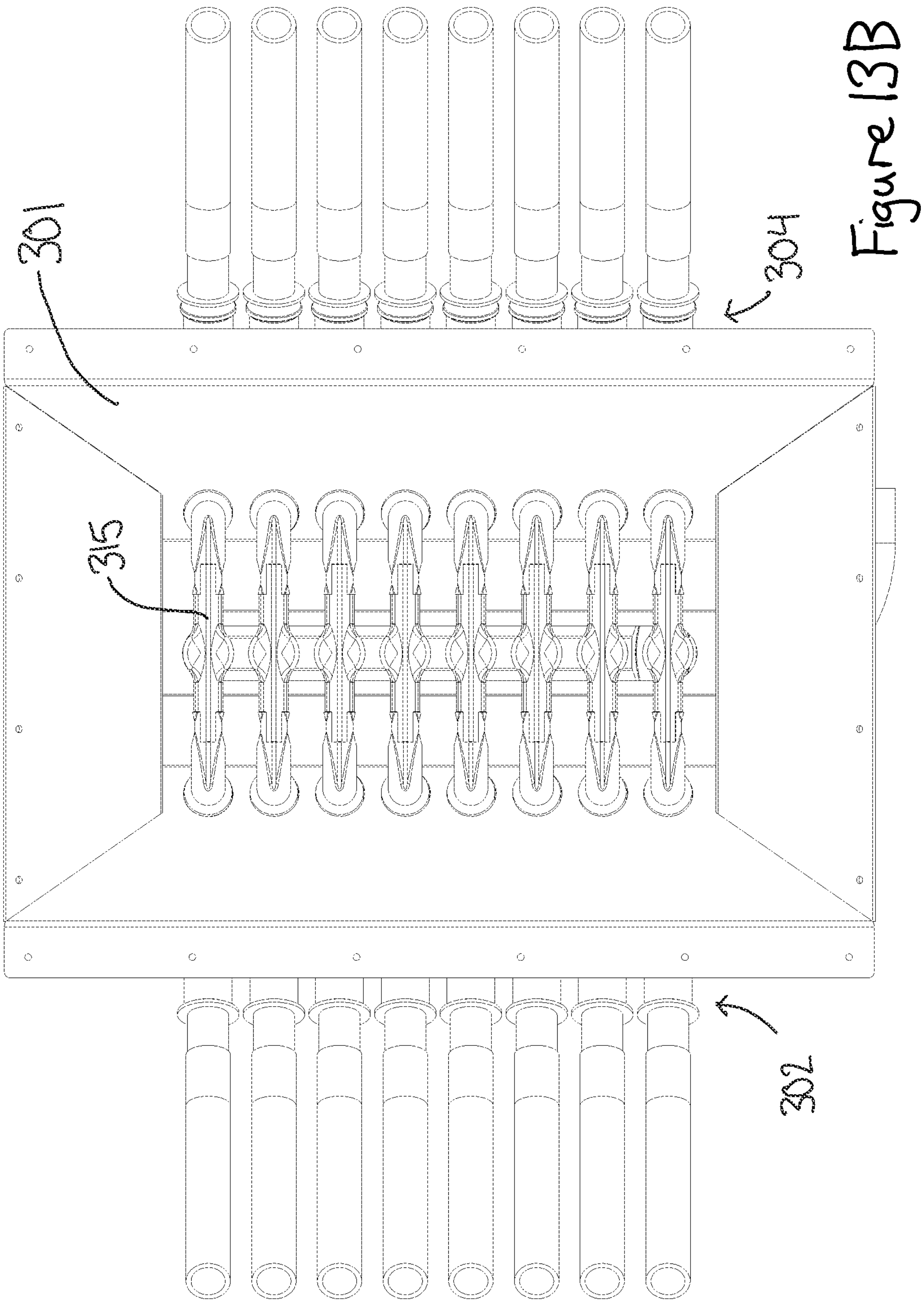
FIG. 13B is a top plan view of the embodiment of the air manifold shown in FIG. 13A.

Each venturi assembly 312 comprises a venturi collar 316, a venturi plenum 305, a venturi coupling 306, a tube 314 providing fluid connection between the nozzle 309 and hose coupling 319, and a sleeve 310 providing fluid communication between the nozzle 309 and the tube 314. Tube 314 is journalled in venturi collar 316. Each of the venturi plenums 305 are coupled to the venturi collar 316 and tube 314 by means of the venturi coupling 306. As may be seen in FIGS. 9 and 11, each air manifold 300 comprises a first array 302 of a plurality of product pickup nozzles 309, and a second array 304 of a plurality of product pickup nozzles 309. Thus, a venturi plenum 305 disposed is in fluid communication with the first array 302 of product pickup nozzles 309, and a second venturi plenum 305' is in fluid communication with the second array 304 of product pickup nozzles 309. In an embodiment, as seen in FIG. 12, a venturi air source 320 is in fluid communication with each of the first and second venturi plenums 305, 305' by means of a series of air ducts 318. However, this arrangement is not intended to be limiting, and each of the venturi plenums 305, 305' may be alternately supplied with air from independent air supply sources, or in another embodiment, the venturi plenums 305, 305' may share the same air supply source as the nozzle plenum 303.

In operation, in an embodiment described herein, a high pressure air stream generated by the venturi air source 320 flows through each of the venturi plenums 305, 305'. From there, the high pressure air stream flows through the venturi coupling 306 and through an annular void 317, forming a venturi between the tubular wall 313 of the hose coupling 319 and the wall of tube 314. Thus, while the main airstream flows from the nozzle plenum 303 through the product flow cavity 308 into the product pickup nozzle 309, and through the tube 314 into the hose coupling 319, and thence into supply hose 311, a secondary or venturi airstream is generated by the venturi air source 320, which flows through each of the venturi plenum 305, 305', through the venturi coupling 306 and through the annular void 317. The venturi has the effect of accelerating the venturi air stream into the primary airstream from nozzles 309. The venturi airstream accelerates the primary airstream at its outermost edges adjacent the walls of the hose coupling 319 and of the supply hose 311, thereby resulting in improved carriage of the entrained agricultural product from the product flow cavity 308 of the air manifold 300 into the supply hoses 311.

As granular agricultural product is carried by the primary airstream, which has been accelerated by and mixed with the venturi airstream, through the supply hoses 311, the air streams, carrying entrained agricultural product, flow into the supply branch 327 of the y-connectors 324, and from there, the airstream and entrained agricultural product flows into the first and second branches 325, 326 of the y-connector 324. Thus, a small reserve of agricultural product builds up within, at the lower ends of, each of the first and second branches 325, 326 of y-connector 324. As agricultural product continuously flows into the first and second branches 325, 326, the agricultural product will eventually block off the screened vents 328.

In prior art product supply systems, of which the applicant is aware, which do not include the venturi assembly 312, applicant has found that the blocking of the screened vents 328 by agricultural product only slows down the air stream, but does not completely stop the air stream from flowing, as the air stream has been observed to continue to vent through the agricultural product and the screen vents 328. However, the applicant has observed that using the venturi assembly 312 has the effect of stopping the air stream from flowing into a y-connector 324. When the screened vents 328 are blocked by agricultural product, with the result that the air stream bypasses such y-connectors 324 and proceeds to further y-connectors 324 connected in series downstream from the blocked y-connector 324. It is believed, to the best of the applicant's knowledge without intending to put forth a theory of operation, that the improved shut off of the air stream supplying entrained agricultural product, in systems incorporating the venturi assembly 312, is a result of the venturi air source 320, being at an equal or greater pressure than the main air source 322, will preferentially supply sufficient air flow so as to carry the agricultural product that may still be entrained in the air flow, even where the screened vents 328 are blocked to the extent that the air stream flowing from the main air source 322 is substantially shut off.

What is claimed is:

1. An air manifold system for supplying an agricultural product to a plurality of metering devices via a corresponding plurality of supply hoses, the system comprising:

a product hopper having a product flow cavity and a nozzle connector, the product hopper adapted to contain the agricultural product and the product hopper in fluid communication with the product flow cavity, the product flow cavity separated from a first plenum by a screen, the first plenum positioned beneath and adjacent to a floor of the product hopper and the screen sandwiched in fluid communication between the first plenum and the product flow cavity, the product hopper further comprising a plurality of nozzles, each nozzle of the plurality of nozzles extending through a wall of the product hopper and adapted to be coupled to the corresponding plurality of supply hoses, and at least one venturi assembly in fluid communication with at least one nozzle of the plurality of nozzles, wherein a first forced air stream flows through the first plenum and the screen into the product flow cavity and is deflected off of the nozzle connector so as to agitate the agricultural product contained in the product flow cavity and thereby entrain the agricultural product in the first air stream, the first air stream carrying the entrained agricultural product into the plurality of nozzles, and wherein a second forced air stream flows through the at least one venturi assembly so as to accelerate the first air stream and the agricultural product entrained in the first air stream towards and through the corresponding plurality of supply hoses when the supply hoses are coupled to the plurality of nozzles.

2. The air manifold system of claim 1 further comprising the corresponding plurality of supply hoses and a reservoir coupled to a downstream end of each supply hose of the corresponding plurality of supply hoses, wherein each reservoir is adapted to hold and feed the agricultural product to a corresponding metering device, each reservoir comprising a screened vent, and wherein the first air stream supplied to each supply hose is substantially reduced in a supply hose of the plurality of supply hoses when the screened vent of the corresponding reservoir is substantially blocked by the agricultural product accumulating in the corresponding reservoir so as to stop the flow of the entrained agricultural product to the corresponding reservoir.

3. The air manifold system of claim 2, wherein the at least one venturi assembly comprises a plurality of venturi assemblies having a second plenum, and wherein each nozzle of the plurality of nozzles is in fluid communication with a corresponding venturi assembly of the plurality of venturi assemblies, and wherein the second air stream is supplied to each venturi assembly of the plurality of venturi assemblies through the second plenum of the plurality of venturi assemblies.

4. The air manifold system of claim 2, wherein each reservoir is selected from a group comprising: a local hopper, a tube, a y-connector.

5. The air manifold system of claim 1, wherein the plurality of nozzles is supported within the product hopper by the nozzle connector.

6. The air manifold system of claim 3, wherein each venturi assembly of the plurality of venturi assemblies comprises a venturi, the venturi including an annular void, and wherein the second air stream flows through the second plenum and enters the annular void of the venturi so as to accelerate the second air stream into the first air stream carrying the entrained agricultural product at an outermost edge of the first air stream adjacent an inner wall of the corresponding supply hose.

7. The air manifold system of claim 6, wherein each venturi assembly further comprises a venturi coupling fluidly connecting the second plenum to a hose coupling, the hose coupling fluidly connecting each nozzle to the corresponding supply hose, wherein the hose coupling defines the annular void between an inner tubular wall of the hose coupling and an outer wall of the nozzle.

8. The air manifold system of claim 1, wherein the plurality of nozzles comprises first and second arrays of nozzles, wherein the first array of nozzles extends through a first side wall of the product hopper and the second array of nozzles extends through a second side wall of the product hopper, the second side wall in opposed facing relation to the first side wall of the product hopper.

9. The air manifold system of claim 1, wherein the at least one venturi assembly comprises a second plenum, and wherein the first and second air streams are generated by one air source in fluid communication with the first and second plenums.

10. The air manifold system of claim 1, wherein the at least one venturi assembly comprises a second plenum, and wherein the first air stream is generated by a first air source in fluid communication with the first plenum and the second air stream is generated by a second air source in fluid communication with the second plenum.

11. The air manifold system of claim 10 further comprising the corresponding plurality of supply hoses and a reservoir coupled to a downstream end of each supply hose of the corresponding plurality of supply hoses, wherein each reservoir is adapted to hold and feed the agricultural product to a corresponding metering device, each reservoir comprising a screened vent, and wherein the first air stream supplied to each supply hose is substantially reduced in a supply hose of the plurality of supply hoses when the screened vent of the corresponding reservoir is substantially blocked by the agricultural product accumulating in the corresponding reservoir so as to stop the flow of the entrained agricultural product to the corresponding reservoir.

12. The air manifold system of claim 11, wherein the at least one venturi assembly comprises a plurality of venturi assemblies having a second plenum, and wherein each nozzle of the plurality of nozzles is in fluid communication with a corresponding venturi assembly of the plurality of venturi assemblies, and wherein the second air stream is supplied to each venturi assembly of the plurality of venturi assemblies through the second plenum of the plurality of venturi assemblies.

13. The air manifold system of claim 11, wherein each reservoir is selected from a group comprising: a local hopper, a tube, a y-connector.

14. The air manifold system of claim 10, wherein the plurality of nozzles is supported within the product hopper by the nozzle connector.

15. The air manifold system of claim 12, wherein each venturi assembly of the plurality of venturi assemblies comprises a venturi, the venturi including an annular void, and wherein the second air stream flows through the second plenum and enters the annular void of the venturi so as to accelerate the second air stream into the first air stream carrying the entrained agricultural product at an outermost edge of the first air stream adjacent an inner wall of the corresponding supply hose.

16. The air manifold system of claim 15, wherein each venturi assembly further comprises a venturi coupling fluidly connecting the second plenum to a hose coupling, the hose coupling fluidly connecting each nozzle to the corresponding supply hose, wherein the hose coupling defines the annular void between an inner tubular wall of the hose coupling and an outer wall of the nozzle.

17. The air manifold system of claim 10, wherein the plurality of nozzles comprises first and second arrays of nozzles, wherein the first array of nozzles extends through a first side wall of the product hopper and the second array of nozzles extends through a second side wall of the product hopper, the second side wall in opposed facing relation to the first side wall of the product hopper.

18. The air manifold system of claim 1, wherein each nozzle of the plurality of nozzles has a nozzle inlet and a nozzle outlet, wherein the nozzle inlet extends into and is in fluid communication with the product flow cavity and the nozzle outlet is positioned outside the product hopper, the nozzle outlet adapted to be coupled to a supply hose of the corresponding plurality of supply hoses, and wherein the venturi assembly is in fluid communication with at least one nozzle outlet of the plurality of nozzles.

19. The air manifold system of claim 1, wherein the nozzle connector has a rigid cross bar geometry.

* * * * *